(12) United States Patent
Ito et al.

(10) Patent No.: US 10,626,264 B2
(45) Date of Patent: Apr. 21, 2020

(54) CONDUCTIVE COMPOSITION, CURRENT COLLECTOR WITH BASE LAYER FOR ELECTRIC STORAGE DEVICE, ELECTRODE FOR ELECTRIC STORAGE DEVICE, AND ELECTRIC STORAGE DEVICE

(71) Applicants: TOYO INK SC HOLDINGS CO., LTD., Chuo-ku, Tokyo (JP); TOYOCOLOR CO., LTD., Chuo-ku, Tokyo (JP)

(72) Inventors: Hirotomo Ito, Tokyo (JP); Yasuyuki Moroishi, Tokyo (JP); Junko Kawahara, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 14 days.

(21) Appl. No.: 15/562,539

(22) PCT Filed: Mar. 18, 2016

(86) PCT No.: PCT/JP2016/058638
§ 371 (c)(1),
(2) Date: Sep. 28, 2017

(87) PCT Pub. No.: WO2016/158480
PCT Pub. Date: Oct. 6, 2016

(65) Prior Publication Data
US 2018/0105687 A1    Apr. 19, 2018

(30) Foreign Application Priority Data

Mar. 30, 2015  (JP) ................................ 2015-068139
Nov. 11, 2015  (JP) ................................ 2015-220863
Dec. 25, 2015  (JP) ................................ 2015-254040

(51) Int. Cl.
| | |
|---|---|
| *H01M 4/66* | (2006.01) |
| *H01M 10/0525* | (2010.01) |
| *C08L 23/26* | (2006.01) |
| *C08L 1/28* | (2006.01) |
| *C08L 23/06* | (2006.01) |
| *H01G 11/38* | (2013.01) |
| *H01G 11/42* | (2013.01) |
| *H01G 11/48* | (2013.01) |
| *H01G 11/50* | (2013.01) |
| *H01G 11/68* | (2013.01) |

(52) U.S. Cl.
CPC .............. *C08L 23/26* (2013.01); *C08L 1/286* (2013.01); *C08L 23/06* (2013.01); *H01G 11/38* (2013.01); *H01G 11/42* (2013.01); *H01G 11/48* (2013.01); *H01G 11/50* (2013.01); *H01G 11/68* (2013.01); *H01M 4/663* (2013.01); *H01M 4/668* (2013.01); *H01M 10/0525* (2013.01); *C08L 2201/54* (2013.01); *C08L 2203/20* (2013.01)

(58) Field of Classification Search
CPC ....................................................... C08L 23/26
See application file for complete search history.

(56) References Cited

U.S. PATENT DOCUMENTS

| | | | | |
|---|---|---|---|---|
| 2009/0263718 | A1* | 10/2009 | Higashizaki | ........ H01M 4/5825 429/221 |
| 2013/0143117 | A1* | 6/2013 | Koh | ...................... H01G 11/30 429/211 |
| 2015/0311001 | A1 | 10/2015 | Kato et al. | |
| 2016/0240836 | A1* | 8/2016 | Aotani | .................. H01M 2/348 |

FOREIGN PATENT DOCUMENTS

| | | |
|---|---|---|
| EP | 2922122 A1 | 9/2015 |
| EP | 2988351 A1 | 2/2016 |
| JP | 10-241665 A | 9/1998 |
| JP | 11-329503 A | 11/1999 |
| JP | 2000-109615 A | 4/2000 |
| JP | 2001-357854 A | 12/2001 |
| JP | 2009-170287 A | 7/2009 |
| JP | 2009-176599 A | 8/2009 |
| JP | 2012-104422 A | 5/2012 |
| JP | 2016-081704 A | 5/2016 |
| WO | WO 2014/077367 A1 | 5/2014 |
| WO | WO 2014/077697 A1 | 5/2014 |
| WO | WO 2014/129313 A1 | 8/2014 |
| WO | WO 2014/157405 A1 | 10/2014 |
| WO | WO 2014/171415 A1 | 10/2014 |
| WO | WO 2015/046469 A1 | 4/2015 |

* cited by examiner

*Primary Examiner* — Brian R Ohara
(74) *Attorney, Agent, or Firm* — Foley & Lardner LLP

(57) ABSTRACT

The present invention addresses the problem of providing an electrically conductive composition which can be used for producing an electric storage device such as a non-aqueous electrolyte secondary battery (e.g., a lithium ion secondary battery) having excellent electric conductivity during an ordinary operation and therefore having excellent battery output properties and the like and also having a function of increasing internal resistance when the internal temperature of the battery is increased, and which enables the production of an electric storage device such as a non-aqueous electrolyte secondary battery having excellent electric conductivity and safety-related functions. The problem can be solved by an electrically conductive composition comprising an electrically conductive carbon material (A), a water-soluble resin (B), water-dispersible resin microparticles (C), an aqueous liquid medium (D), and optionally a water-soluble polyvalent metal compound (E), said composition being characterized in that the water-dispersible resin microparticles contain at least olefin resin microparticles.

17 Claims, No Drawings

CONDUCTIVE COMPOSITION, CURRENT COLLECTOR WITH BASE LAYER FOR ELECTRIC STORAGE DEVICE, ELECTRODE FOR ELECTRIC STORAGE DEVICE, AND ELECTRIC STORAGE DEVICE

CROSS-REFERENCE TO RELATED APPLICATIONS

This application is a National Stage application of PCT/JP2016/058638, filed Mar. 18, 2016, which claims priority from Japanese application JP 2015-068139, filed Mar. 30, 2015, JP 2015-220863, filed Nov. 11, 2015, and JP 2015-254040, filed Dec. 25, 2015.

TECHNICAL FIELD

The present invention relates to a conductive composition, an electrode for an electric storage device (for example, a nonaqueous electrolyte secondary battery such as a lithium ion secondary battery, an electric double layer capacitor, or a lithium ion capacitor) obtained using the composition, and an electric storage device obtained using the electrode. Specifically, the present invention relates to a conductive composition, an electrode for an electric storage device, and an electric storage device each having a function of increasing internal resistance of a battery when the temperature of the battery rises.

BACKGROUND ART

In recent years, a compact portable electronic device such as a digital camera or a mobile phone has been widely used. In these electronic devices, it has been demanded to minimize the volume and to reduce the weight all the time. In a battery mounted thereon, it has been also demanded to realize a small, lightweight, and high capacity battery. Particularly, a lithium ion secondary battery obtains a higher energy density than a water-soluble secondary battery such as a lead storage battery, a nickel cadmium battery, or a nickel hydrogen battery, and therefore importance thereof as a power source for a personal computer, a portable terminal, or the like has increased. Furthermore, the lithium ion secondary battery is expected to be preferably used as a high output power source mounted on a vehicle.

The lithium ion secondary battery has an advantage of a high energy density, but uses a nonaqueous electrolyte, and therefore sufficient countermeasures against safety are required. In recent years, securing safety has become a big problem in accordance with a larger size of a battery and a higher capacity thereof. For example, when the temperature of a battery rises abnormally and rapidly due to overcharge, short circuit inside the battery, or the like, it is difficult to regulate heat generation only by a safety mechanism provided outside the battery, and there is a risk of ignition.

Patent Literature 1 describes a method for bonding an electron conductive material having a function of a positive temperature coefficient resistor (hereinafter, referred to as PTC) to a current collector. However, the thickness of the electron conductive material is as thick as 50 μm, and therefore an energy density as an entire battery is lowered. Therefore, this method is not preferable.

Patent Literature 2 discloses that PTC characteristics are imparted to any one of a positive electrode, a negative electrode, and nonaqueous electrolytic solution. However, in order to impart PTC characteristics to these, it is necessary to add a large amount of additives not contributing to a battery capacity, resulting in a decrease in energy density.

Patent Literature 3 describes a method for providing a conductive layer formed of a crystalline thermoplastic resin, a conductive agent, and a binder on a surface of a current collector. When the temperature inside a battery exceeds a melting point of the crystalline thermoplastic resin, resistance of this conductive layer rises, and a current between the current collector and an active material is cut off. However, internal resistance during normal operation of the battery increases, and output characteristics of the battery are lowered. Therefore, this method is not preferable.

Patent Literature 4 describes a method for providing a conductive layer formed of polyvinylidene fluoride and a conductive agent on a surface of a current collector and heating the current collector provided with this conductive layer at a temperature exceeding 120° C. However, a step of a heat treatment is added, and an increase in resistance when the temperature inside a battery rises is not sufficient. Therefore, this method is not preferable.

Patent Literature 5 describes a method for providing a current collector provided with a conductive layer formed of conductive particles, carboxymethyl cellulose, a water-dispersible olefin resin, and a dispersant. However, carboxymethyl cellulose is used as a thickener for a dispersion, and the addition amount thereof is as small as 5% by mass or less in the total solid content of 100% by mass of the dispersion.

Patent Literature 6 describes a method for providing a conductive layer formed of a composition in which a volume average particle diameter of heat fusible particles is larger than a volume average particle diameter of conductive inorganic particles. However, an increase in resistance when the temperature in a battery rises is not sufficient. Therefore, this method is not preferable.

Patent Literature 7 describes a method for providing a current collector provided with a conductive layer formed of an aggregate of polyolefin emulsion particles using a polymer flocculant and/or a low molecular flocculant and a conductive material. However, it is difficult to control an aggregation diameter of an emulsion particle using a polymer or low molecular flocculant, and an effect thereof is not sufficient. Furthermore, a surface of a conductive material is covered with a nonconductive polyolefin resin. Therefore, internal resistance during normal operation of a battery increases, and output characteristics of the battery are lowered. Therefore, this method is not preferable.

CITATION LIST

Patent Literature

Patent Literature 1: JP 10-241665 A
Patent Literature 2: JP 11-329503 A
Patent Literature 3: JP 2001-357854 A
Patent Literature 4: JP 2012-104422 A
Patent Literature 5: WO 2015/046469 A
Patent Literature 6: JP 2009-176599 A
Patent Literature 7: WO 2014/157405 A

SUMMARY OF INVENTION

Technical Problem

An object of the present invention is to provide a conductive composition for forming an electric storage device (for example, a nonaqueous electrolyte secondary battery (for example, a lithium ion secondary battery), an electric double layer capacitor, or a lithium ion capacitor) having excellent output characteristics or the like of a battery due to excellent conductivity during normal operation and having a function of increasing internal resistance when the internal temperature of the battery rises, the electric storage device having excellent conductivity and safety function.

Solution to Problem

The present invention provides a conductive composition containing a conductive carbon material (A), a water-soluble resin (B), and water-dispersible resin fine particles (C) containing at least olefin resin fine particles. At the time of heat generation of a battery, the conductive composition increases resistance of a current collector, cuts off a current, and avoids ignition or the like of the battery. In addition, a resin that increases internal resistance at the time of heat generation is formed of water-dispersible resin fine particles. Therefore, conductivity of the carbon material (A) is not impaired, internal resistance during normal operation can be reduced, and output characteristics can be improved.

Furthermore, as a result of intensive studies, the present inventors have found that the water-soluble resin (B) contained in the conductive composition has a function of continuously increasing internal resistance when the internal temperature of the battery rises, and have achieved the present invention.

For example, when the internal temperature of the battery rises due to internal short circuit or the like, the olefin resin fine particles contained in the conductive composition undergo volume expansion, and thereby cut contact between conductive carbon materials. This increases resistance of an electrode itself. Therefore, a current flowing in a short-circuited portion decreases, Joule heat generation is suppressed, and it is considered that an effect of maintaining safety of the battery is exhibited. However, at the same time as the volume expansion of the polyolefin resin fine particles, the resin fine particles are melted, the carbon materials are brought into contact with each other again, internal resistance of the battery does not rise sufficiently, and safety cannot be maintained.

Meanwhile, by inclusion of a predetermined amount of the water-soluble resin (B) in the conductive composition, it has been confirmed that the water-soluble resin (B) has an effect of preventing re-contact between carbons even when the olefin resin fine particles are melted, and it has been found that safety of the battery is dramatically improved.

Furthermore, the water-soluble resin (B) is chemically stable in the conductive composition (slurry). Therefore, the water-soluble resin (B) has little change over time and has an excellent coating characteristic when a base layer is formed.

Furthermore, it has been found that by properly controlling a secondary aggregated particle diameter of the conductive carbon material, resistance can be more effectively increased, and safety of the battery can be dramatically improved.

Furthermore, by modifying the water-dispersible resin fine particles (C), melt resistance of the resin can be imparted, volume expansion of the polyolefin resin can be maintained, and an effect of cutting connection between the carbon materials can be maintained continuously.

In addition, the present invention provides a conductive composition containing the conductive carbon material (A), the water-dispersible resin fine particles (C), an aqueous liquid medium (D), and a water-soluble polyvalent metal compound (E). At the time of heat generation of a battery, the conductive composition increases resistance of a current collector, cuts off a current, and avoids ignition or the like of the battery. In a case of dispersing the conductive carbon material (A) in the conductive composition, a surfactant is preferably used from a viewpoint of a solid content of the conductive composition, and the water-soluble resin (B) is more preferably used from a viewpoint of electrolytic solution resistance and an increase in internal resistance of the battery at the time of heat generation.

Furthermore, it has been found that by the presence of the water-soluble polyvalent metal compound (E) in the conductive composition, an effect of cutting contact between the conductive carbon, materials due to volume expansion of the water-dispersible olefin resin fine particles, occurring at the time of heat generation of the battery, is enhanced, leading to the present invention. In the present invention, the resin fine particles are aggregated using a metal ion of the polyvalent metal compound (E). Therefore, an aggregated particle diameter can be controlled relatively easily, and by changing the valence of the metal ion, aggregation shapes of the particles can be changed, and the aggregated particles can be relatively easily controlled.

In addition, a resin that increases internal resistance at the time of heat generation is formed of water-dispersible olefin resin fine particles. Therefore, conductivity of the carbon material (A) is not impaired, internal resistance during normal operation can be reduced, and output characteristics, cycle characteristics, and the like can be improved.

It has been found that, due to the above effects, the output characteristics, the repeated cycle characteristics of charging and discharging can be improved during normal operation, and safety of the battery is dramatically improved when internal short circuit, overcharging, or the like occurs.

[1] A conductive composition containing a conductive carbon material (A), a water-soluble resin (B), water-dispersible resin fine particles (C), and an aqueous liquid medium (D), characterized in that the water-dispersible resin fine particles contain at least olefin resin fine particles.

[2] The conductive composition according to [1], characterized in that the content of the conductive carbon material (A) is 10 to 70% by mass, the content of the water-soluble resin (B) is 1 to 50% by mass, and the content of the water-dispersible resin fine particles (C) is 10 to 70% by mass in the total solid content of 100% by mass of the conductive composition.

[3] The conductive composition according to [1] or [2], in which a ratio of the olefin resin fine particles in resin fine particles contained in the water-dispersible resin fine particles (C) is 50 to 100% by mass.

[4] The conductive composition according to any one of [1] to [3], characterized in that the olefin resin fine particles contained in the water-dispersible resin fine particles (C) are polyolefin resin particles modified with at least a carboxylic acid or a carboxylate ester, and that a ratio (Y)/(X) between a maximum peak height (maximum absorbance) (X) at 2800 to 3000 $cm^{-1}$ and a maximum peak height (maximum absorbance) (Y) at 1690 to 1740 $cm^{-1}$ is 0.03 to 1.0 in an infrared absorption spectrum of the polyolefin resin particles.

[5] The conductive composition according to [4], characterized in that the olefin resin fine particles contained in the water-dispersible resin fine particles (C) are formed of polyethylene modified with at least a carboxylic acid or a carboxylate ester, and that the ratio (Y)/(X) is 0.1 to 0.8.

[6] The conductive composition according to [4], characterized in that the olefin resin fine particles contained in the water-dispersible resin fine particles (C) are formed of polypropylene modified with at least a carboxylic acid or a carboxylate ester, and that the ratio (Y)/(X) is 0.03 to 0.5.

[7] The conductive composition according to any one of [1] to [6], characterized in that a coating film coated with the conductive composition has a gloss value of 0.1 to 55.

[8] The conductive composition according to any one of [1] to [7], characterized in that the conductive carbon material (A) is carbon black in which secondary particles are formed by aggregation of primary particles, that the primary particles have diameters of 1 to 100 nm, and that a volume average particle diameter (D50) is 0.2 to 5 μm.

[9] The conductive composition according to [8], characterized in that the volume average particle diameter of the carbon black is larger than the volume average particle diameter of the olefin resin fine particles contained in the water-dispersible resin particles (C).

[10] The conductive composition according to any one of [1] to [9], further containing a water-soluble polyvalent metal compound (E), characterized in that a mass ratio (E')/(C') between a solid content mass (C') of the olefin resin fine particles in the water-dispersible resin fine particles (C) and a mass (E') of a metal ion in the polyvalent metal compound (E) is 0.001 to 0.1% by mass.

[11] The conductive composition according to any one of [1] to [10], characterized by containing water-dispersible aggregated fine particles formed of the olefin resin fine particles in the water-dispersible resin fine particles (C) and the polyvalent metal compound (E).

[12] The conductive composition according to [11], characterized in that a volume average particle diameter (CV1) of the olefin resin fine particles in the water-dispersible resin fine particles (C) is 0.05 to 1 μm, and that a ratio (CV2)/(CV1) between the (CV1) and a volume average particle diameter (CV2) of the water-dispersible aggregated fine particles is 1.1 to 5.0.

[13] The conductive composition according to any one of [1] to [12], characterized in that the conductive composition is used for forming a base layer of an electrode for an electric storage device.

[14] A current collector with a base layer for an electric storage device, including a current collector and a base layer formed from the conductive composition according to [13].

[15] An electrode for an electric storage device, including a current collector, a base layer formed from the conductive composition according to [13], and a mixture layer formed from an electrode-forming composition containing an electrode active material and a binder.

[16] An electric storage device including a positive electrode, a negative electrode, and an electrolytic solution, in which at least one of the positive electrode and the negative electrode is the electrode for an electric storage device according to [15].

[17] The electric storage device according to [16], in which the electric storage device is any one of a nonaqueous electrolyte secondary battery, an electric double layer capacitor, and a lithium ion capacitor.

[18] A method for manufacturing the conductive composition according to any one of [10] to [12] by adding the water-dispersible resin fine particles (C) to a slurry in which the conductive carbon material (A), the water-soluble resin (B), the aqueous liquid medium (D), and the water-soluble polyvalent metal compound (E) are dispersed.

[19] A method for manufacturing the conductive composition according to any one of [10] to [12] by adding the water-dispersible resin fine particles (C) and the water-soluble polyvalent metal compound (E) to a slurry in which the conductive carbon material (A), the water-soluble resin (B), and the aqueous liquid medium (D) are dispersed.

Advantageous Effects of Invention

By inclusion of a conductive carbon material (A), a water-soluble resin (B), water-dispersible resin fine particles (C) containing at least olefin resin fine particles, and optionally a water-soluble polyvalent metal compound (E), it is possible to provide an electric storage device (for example, a nonaqueous electrolyte secondary battery such as a lithium ion secondary battery, an electric double layer capacitor, or a lithium ion capacitor) having a function of increasing internal resistance without impairing conductivity of the carbon material when the internal temperature of a battery rises.

DESCRIPTION OF EMBODIMENTS

<Conductive Composition>

As described above, the conductive composition of the present invention can be used for forming a base layer of an electric storage device. The conductive composition contains a conductive carbon material (A), a water-soluble binder (B), water-dispersible resin fine particles (C) containing at least olefin resin fine particles, an aqueous liquid medium (D), and optionally a water-soluble polyvalent metal compound (E).

The content of the conductive carbon material (A) in the total solid content of 100% by mass of the conductive composition is 10 to 70% by mass, preferably 10 to 60% by mass, more preferably 10 to 50% by mass, still more preferably 15 to 50% by mass, particularly preferably 15 to 45% by mass, and most preferably 20 to 40% by mass from viewpoints of conductivity and internal resistance.

The content of the water-soluble resin (B) in the total solid content of 100% by mass of the conductive composition is 1 to 50% by mass, preferably 5 to 50% by mass, more preferably 10 to 50% by mass, still more preferably 10 to 40% by mass, and particularly preferably 15 to 35% by mass from viewpoints of adhesiveness and conductivity of an electrode, and an increase in internal resistance of a battery at the time of heat generation. When the content of the water-soluble resin (B) is small, it is considered that it is impossible to suppress melting of the resin which is considered to occur at the same time as volume expansion of the polyolefin resin (water-dispersible resin fine particles (C)) due to heating, and that it may be impossible to cut the carbon materials (A) efficiently, and it is expected that internal resistance will not rise so much even when the internal temperature of a battery rises. Therefore, this case is not preferable.

The content of the water-dispersible resin fine particles (C) in the total solid content of 100% by mass of the conductive composition is 10 to 70% by mass, preferably 20 to 70% by mass, more preferably 20 to 60% by mass, still more preferably 30 to 60% by mass, and particularly preferably 35 to 60% by mass from viewpoints of internal resistance, conductivity, and an increase in internal resistance of a battery at the time of heat generation. When the content of the water-dispersible resin fine particles (C) is small, there is a case where volume expansion of the polyolefin resin (water-dispersible resin fine particles (C)) is not sufficiently exhibited. As a result, even when the internal temperature of a battery rises, it is expected that internal resistance does not rise so much. Therefore, this case is not preferable.

The total content of the conductive composition (A), the water-soluble resin (B), and the water-dispersible resin fine particles (C) in the total solid content of 100% by mass of the conductive composition is preferably 80% by mass or more, more preferably 90% by mass or more, and still more preferably 95% by mass or more from viewpoints of internal resistance, conductivity, and an increase in internal resistance of a battery at the time of heat generation. An optional component may be added to the above composition as necessary.

The optional component is not particularly limited. However, for example, a material which adsorbs or consumes an acid generated by a reaction of an electrolytic solution, a material which generates a gas at a predetermined temperature or higher, an inorganic PTC material, or a material which holds a conductive path after polyolefin resin fine particles undergo volume expansion may be added.

Examples of the material which adsorbs an acid generated by a reaction of an electrolytic solution include magnesium oxide (MgO), aluminum oxide ($Al_2O_3$), boron oxide ($B_2O_3$), gallium oxide ($Ga_2O_3$), and indium oxide ($In_2O_3$).

Examples of the material which consumes an acid generated by a reaction of an electrolytic solution include metal carbonates such as magnesium carbonate and calcium carbonate, metal organic salts such as sodium carboxylate, potassium carboxylate, sodium sulfonate, potassium sulfonate, sodium benzoate, and potassium benzoate, silicates such as sodium silicate, potassium silicate, aluminum silicate, magnesium silicate, and silicon dioxide, and alkaline hydroxides such as magnesium hydroxide.

Examples of the material which generates a gas at a predetermined temperature or higher include carbonates such as lithium carbonate, zinc carbonate, lead carbonate, and strontium carbonate, and expanded graphite.

Examples of the inorganic PTC material include $BaTiMO_2$ (M is at least one element selected from Cr, Pb, Ca, Sr, Ce, Mn, La, Y, Nb, and Nd).

Examples of the material which holds a conductive path after polyolefin resin fine particles undergo volume expansion include inorganic fine particles such as cellulose nanofibers, silica, and alumina.

A mass ratio (E')/(C') between a solid content mass (C') of the water-dispersible olefin resin fine particles contained in the water-dispersible resin fine particles (C) and a mass (E') of a metal ion in the water-soluble polyvalent metal compound is preferably 0.001 to 0.1% by mass, and more preferably 0.002 to 0.03% by mass from viewpoints of an increase in internal resistance of a battery at the time of heat generation and stability of the water-dispersible olefin resin fine particles.

An appropriate viscosity of the conductive composition depends on a coating method of the conductive composition, but is generally preferably 10 mPa·s or more and 30,000 mPa·s or less.

<Conductive Carbon Material (A)>

The conductive carbon material (A) in the present invention is not particularly limited as long as being a conductive carbon material. However, graphite, carbon black, conductive carbon fibers (carbon nanotubes, carbon nanofibers, or carbon fibers), fullerenes, and the like can be used singly or in combination of two or more kinds thereof. Carbon black is preferably used from viewpoints of conductivity, availability, and cost.

As carbon black, various types of carbon black can be used singly or in combination of two or more kinds thereof, and examples thereof include furnace black manufactured by continuously and thermally decomposing a gas or liquid raw material in a reaction furnace, Ketjen black manufactured particularly from ethylene heavy oil as a raw material, channel black obtained by burning a raw material gas, bringing the flame into contact with a bottom surface of channel steel, and rapidly cooling the channel steel to cause precipitation, thermal black obtained by cyclically repeating combustion and thermal decomposition using a gas as a raw material, and acetylene black manufactured particularly from an acetylene gas as a raw material. In addition, it is possible to use carbon black which has been subjected to a usual oxidation treatment, hollow carbon, and the like.

An oxidation treatment of carbon is a treatment for directly introducing (covalently bonding) an oxygen-containing polar functional group such as a phenol group, a quinone group, a carboxyl group, or a carbonyl group into a surface of carbon by treating carbon at a high temperature in air or secondarily treating carbon with nitric acid, nitrogen dioxide, ozone, or the like, and is generally performed for improving carbon dispersibility. However, in general, as the introduction amount of a functional group increases, the conductivity of carbon decreases, and therefore it is preferable to use carbon which has not been subjected to an oxidation treatment.

In addition, in the carbon black used in the present invention, as a primary particle diameter is smaller, the number of particles contained per unit mass is larger and the number of contact points between carbon black particles is larger, and therefore this is advantageous for reducing internal resistance of an electrode. Specifically, the primary particle diameter is preferably 1 to 100 nm, more preferably 10 to 80 nm, and still more preferably 20 to 70 nm from viewpoints of conductivity and availability. However, the primary particle diameter referred to herein is a spherical particle forming an aggregate (primary aggregate), and is an average of particle diameters measured with an electron microscope or the like.

The carbon black used in the present invention forms an agglomerate (secondary aggregate) formed by aggregation of aggregates (primary aggregates). When the size of the secondary aggregate is larger than a predetermined size, a conductive network is easily formed. This is advantageous for reducing internal resistance of an electrode. In addition, as a result of intensive studies in the present invention, it has been clarified that internal resistance of a battery increases when the internal temperature of the battery rises due to a predetermined secondary aggregate formed by carbon black. In the present invention, the secondary aggregate is represented by a volume average particle diameter. Specifically, the volume average particle diameter (D50) is 0.2 to 5 μm, preferably 0.3 to 5 μm, and more preferably 0.3 to 3 μm. When the volume average particle diameter is too small, it is expected that internal resistance will not increase so much even when the internal temperature of a battery rises. Therefore, this case is not preferable. One of the reasons for this is considered to be a possibility that an existence form of each material inside a base layer changes at the time of temperature rise and carbon materials are not effectively cut.

The volume average particle diameter referred to herein is a particle diameter (D50) at 50% when a volume ratio of particles is integrated from a particle having a small particle diameter in a volume particle size distribution, and is measured by a general particle size distribution meter, for example, a laser scattering type particle size distribution meter ("Microtrac MT 3300 EXII" manufactured by Nikkiso Co., Ltd.). Measurement of the volume average particle diameter by a laser scattering method can be performed as follows. A slurry obtained by mechanically dispersing the conductive carbon material (A) and the water-soluble resin (B) is diluted 100 to 1000 times with water according to a solid content. The diluted slurry is injected into a cell of a measuring apparatus [Microtrac MT 3300 EXIT manufactured by Nikkiso Co., Ltd.] until reaching an appropriate concentration in sampling loading. Conditions for a refractive index of a solvent (water in the present invention) corresponding to a sample are input, and then measurement is performed.

The volume average particle diameter of the carbon black used in the present invention is preferably larger than the volume average particle diameter of the water-dispersible resin fine particles (C). When the volume average particle diameter of the water-dispersible resin fine particles (C) is larger than the volume average particle diameter of the carbon black, in a case where the internal temperature of a battery rises, the resistance of the battery does not increase efficiently (a possibility that the carbon materials are not effectively cut). In addition, the internal resistance during normal operation increases and battery performance may be deteriorated. A method for measuring the volume average particle diameter of the water-dispersible resin fine particles (C) will be described separately.

Generally, as a specific surface area of the carbon black used in the present invention is larger, a primary particle diameter of the carbon black is smaller, and therefore the number of contact points between the particles is larger. This is advantageous for reducing internal resistance of an electrode. Specifically, it is desirable to use carbon black having a specific surface area (BET) determined from the adsorption amount of nitrogen of preferably 20 to 1500 $m^2/g$, more preferably 40 to 1500 $m^2/g$ from viewpoints of conductivity, coating suitability, electrode adhesion, and availability.

Examples of commercially available carbon black include Toka Black #4300, #4400, #4500, and #5500 (furnace black manufactured by Tokai Carbon Co., Ltd.), Printex L (furnace black manufactured by Degussa AG), Raven 7000, 5750, 5250, 5000 ULTRA III, and 5000 ULTRA, Conductex SC ULTRA and Conductex 975 ULTRA, PUER BLACK 100, 115, and 205 (furnace black manufactured by Columbian Co.), #2350, #2400B, #2600B, #3005OB, #3030B, #3230B, #3350B, #3400B, and #5400B (furnace black manufactured by Mitsubishi Chemical Corporation), MONARCH 1400, 1300, and 900, Vulcan XC-72R, and Black Pearls 2000 (furnace black manufactured by Cabot Corporation), Ensaco250G, Ensaco260G, Ensaco350G, and SuperP-Li (manufactured by TIMCAL), Ketjen Black EC-300J and EC-600JD (manufactured by Akzo), and Denka Black and Denka Black HS-100 and FX-35 (acetylene black manufactured by Denki Kagaku Kogyo KK). Examples of graphite include artificial graphite and natural graphite such as scalp graphite, massive graphite, or earthy graphite. However, the commercially available carbon black and the graphite are not limited thereto, and two or more kinds thereof may be used in combination.

As the conductive carbon fiber, a conductive carbon fiber obtained by firing a raw material derived from petroleum is preferable, but a conductive carbon fiber obtained by firing a raw material derived from a plant can also be used. Examples thereof include VGCF manufactured from a raw material derived from petroleum, manufactured by Showa Denko KK.

<Water-Soluble Resin (B)>

The water-soluble resin (B) in the present invention can be dissolved without being separated or precipitated in water after 1 g of the water-soluble resin (B) is put in 99 g of water at 25° C., and the resulting mixture is stirred and allowed to stand at 25° C. for 24 hours.

The water-soluble resin (B) is not particularly limited as long as being a water-soluble resin as described above, but examples thereof include an acrylic resin, a polyurethane resin, a polyester resin, a polyamide resin, a polyimide resin, a polyallylamine resin, a phenol resin, an epoxy resin, a phenoxy resin, a urea resin, a melamine resin, an alkyd resin, a formaldehyde resin, a silicone resin, a polyvinyl alcohol resin, a fluororesin, and a polymer compound containing a polysaccharide resin such as carboxymethyl cellulose. In addition, a modified product, a mixture, or a copolymer of these resins may be used as long as being water-soluble. These water-soluble resins can be used singly or in combination of two or more kinds thereof.

A molecular weight of the water-soluble resin (B) is not particularly limited, but a mass average molecular weight thereof is preferably 5,000 to 2,000,000. The mass average molecular weight (Mw) indicates a molecular weight in terms of polyethylene oxide in gel permeation chromatography (GPC).

In the present invention, carboxymethyl cellulose is preferably used as the water-soluble resin (B), and a mass average molecular weight thereof is more preferably 10,000 to 70,000, and an etherification degree is more preferably 0.3 to 1.0 from a viewpoint of an increase in resistance when the internal temperature of a battery rises. The etherification degree is determined by boiling an ashed sample in sulfuric acid, adding the resulting product to a phenolphthalein indicator, and back titrating an excessive acid with potassium hydroxide.

Furthermore, a viscosity of a 1% by mass aqueous solution obtained by putting 1 g of carboxymethyl cellulose in 99 g of water at 25° C. and stirring the resulting mixture is preferably 0.01 to 0.1 Pa·s. The viscosity of the aqueous solution is measured with a rheometer (AR-G2 manufactured by TA Instruments Inc.) at a measurement temperature of 25° C. and a shear rate of 360 (1/s) using a cone plate (60 mm, 1°).

As such carboxymethyl cellulose, commercially available carboxymethyl cellulose can be used, and examples thereof include #1110, #1120, #1130, #1140. #1170, #1210, #1240, #1250, #1260, and #1270 manufactured by Daicel Corporation, but is not limited thereto.

<Water-Dispersible Resin Fine Particles (C)>

The water-dispersible resin fine particles (C) in the present invention are generally called an aqueous emulsion, and the resin particles are dispersed in a form of fine particles without being dissolved in water.

The water-dispersible resin fine particles contain at least olefin resin fine particles. A ratio of the olefin resin fine particles contained in the water-dispersible resin fine particles is 50 to 100% by mass. Two or more kinds of olefin resin fine particles may be combined. Two or more kinds of water-dispersible resin fine particles containing particles other than the olefin resin fine particles may be combined as necessary. The water-dispersible resin fine particles other than the olefin resin fine particles are not particularly limited, but examples thereof include a (meth)acrylic emulsion, a nitrile emulsion, a urethane emulsion, a diene emulsion (SBR or the like), and a fluorine emulsion (PVDF, PTFE, or the like).

The water-dispersible resin fine particles are not particularly limited as long as being a resin which can cut contact between conductive carbon materials dispersed in a conductive layer due to volume expansion of an olefin resin within a range of 80 to 180° C. Examples of an olefin component of the polyolefin resin include ethylene, propylene, isobutylene, isobutene, 1-butene, 2-butene, 1-pentene, 4-methyl-1-pentene, 3-methyl-1-pentenne, 1-hexene, 1-octene, and norbornene. A single polymer of each of these olefin components may be used, or a copolymer of two or more components thereof may be used. In addition, due to an effect of maintaining volume expansion of a polyolefin when the internal temperature of a battery rises, modification and copolymerization with a compound having a carboxylic acid or a carboxylate ester may be performed.

In the present invention, the olefin resin fine particles contained in the water-dispersible resin fine particles (C) are preferably modified with a compound having at least a carboxylic acid or a carboxylate ester. Melt resistance of the resin can be imparted by modification. Therefore, it is considered that the volume expansion of the polyolefin resin can be maintained when the internal temperature of a battery rises due to internal short circuit or the like and an effect of cutting carbon materials can be maintained. Furthermore, the water-dispersible olefin resin fine particles form an aggregated structure via the water-soluble polyvalent metal compound (E), and therefore an effect of cutting carbon materials can be further enhanced. When a carboxylic acid or a carboxylate ester is modified in a small amount or unmodified, there is a case where the internal resistance does not increase so much even when the internal temperature of a battery rises. As one of the reasons for this, it is considered that volume expansion and melting of the polyolefin resin occur simultaneously due to rising in the internal temperature of a battery, and therefore it may be impossible to effectively cut carbon materials. From this fact, it is preferable to suppress melting by modifying the polyolefin resin in a certain amount or more.

A component of a carboxylic acid or a carboxylate ester is not particularly limited, but examples thereof include acrylic acid, methacrylic acid, maleic anhydride, maleic acid, itaconic anhydride, itaconic acid, fumaric acid, crotonic acid, methyl acrylate, methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, dodecyl (meth)acrylate, stearyl (meth)acrylate, vinyl formate, vinyl acetate, vinyl propionate, and vinyl pipalate.

The modification amount of the above modified polyolefin resin fine particles can be determined by a total reflection measurement method (ATR) with a Fourier transform infrared spectrometer (FT-IR: Spectrum One/100 manufactured by PerkinElmer). A ratio $(Y)/(X)$ between a maximum peak height (maximum absorbance) $(X)$ derived from olefin at 2800 to 3000 $cm^{+1}$ and a maximum peak height (maximum absorbance) $(Y)$ derived from carbonyl at 1690 to 1740 $cm^{-1}$ is preferably 0.03 to 1.0, and more preferably 0.05 to 1.0. In the resin fine particles formed of polyethylene, the ratio $(Y)/(X)$ is preferably 0.1 to 0.8, and more preferably 0.3 to 0.8. In the resin fine particles formed of polypropylene, the ratio $(Y)/(X)$ is preferably 0.03 to 0.5, and more preferably 0.05 to 0.5.

Herein, the peak height is obtained by measuring, by FT-IR, a solid matter obtained by removing a dispersion medium from the water-dispersible resin fine particles (C) and finally drying the resulting product at 120° C. The modification amount of the polyolefin resin fine particles can be determined by a ratio $(Y)/(X)$ in which, using a spectrum obtained by plotting absorbance with respect to the wave number, $(X)$ is a height (maximum absorbance) from a maximum peak out of two or four olefin-derived peaks observed at 2800 to 3000 $cm^{-1}$ to a baseline BX when a straight line connecting a point indicating absorbance at 2700 $m^{-1}$ and a point indicating absorbance at 3000 $cm^{-1}$ is taken as the baseline BX, and $(Y)$ is a height (maximum absorbance) from a maximum peak derived from carbonyl at 1690 to 1740 $cm^{-1}$ to a baseline BY when a straight line connecting a point indicating absorbance at 1650 $m^{-1}$ and a point indicating absorbance at 1850 $cm^{-1}$ is taken as the baseline BY. In general, two peaks are observed in a polyethylene resin, and four peaks are observed in a polypropylene resin, but the maximum peaks are observed near 2915 $cm^{-1}$ in both the resins.

As the above water-dispersible resin fine particles, commercially available water-dispersible resin fine particles can be used, and examples thereof include Arrow Base SB-1200, SD-1200, SE-1200, TC-4010, and TD-4010 manufactured by Unitika Ltd., Aquapetro DP-2401 and DP-2502 manufactured by Toyo ADL Corporation, Zeiksen AC, A, AC-HW-10, L, NC, and N manufactured by Sumitomo Seika Co., Chemipearl A100, A400, M200, S100, S200, S300V100, V200, V300, W100, W200, W300, W400, W4005, and WP100 manufactured by Mitsui Chemicals, Inc., Hardren NZ-1004 and NZ-1015 manufactured by Toyobo Co., Ltd., and Hi-tech E-6500, P-9018, and S-3121 manufactured by Toho Chemical Industry Co., Ltd, but are not limited thereto, and two or more kinds thereof may be used in combination.

As the dispersion medium of the water-dispersible resin fine particles (C) in the present invention, water is preferably used, but a liquid medium compatible with water may be used for stabilization or the like of the resin fine particles. Examples of the liquid medium compatible with water include alcohols, glycols, cellosolves, amino alcohols, amines, ketones, carboxylic acid amides, phosphoric acid amides, sulfoxides, carboxylate esters, phosphates, ethers, and nitriles, and may be used in a range compatible with water.

An average particle diameter of the water-dispersible resin fine particles (C) in the present invention is preferably 0.01 to 5 μm, and more preferably 0.05 to 1 μm. When the particle diameter is too small, it is difficult to manufacture the water-dispersible resin fine particles (C) stably. Meanwhile, when the particle diameter is too large, it is difficult to keep conductivity of a conductive layer uniformly, the internal resistance during normal operation increases, and battery performance is deteriorated.

Note that the average particle diameter in the present invention means a volume average particle diameter (MV), which can be measured by a dynamic light scattering method. Measurement of the average particle diameter by the dynamic light scattering method can be performed as follows. A dispersion of water-dispersible resin fine particles is diluted 200 to 1000 times with water according to a solid content. Approximately 5 ml of the diluted solution is injected into a cell of a measuring apparatus [Nanotrac manufactured by Nikkiso Co., Ltd.], conditions for a refractive index of a solvent (water in the present invention) corresponding to a sample and the resin are input, and then measurement is performed.

<Aqueous Liquid Medium (D)>

Water is preferably used as the aqueous liquid medium (D) used in the present invention, but as necessary, for example, in order to improve a coating property to a current collector, a liquid medium compatible with water may be used.

Examples of the liquid medium compatible with water include alcohols, glycols, cellosolves, amino alcohols, amines, ketones, carboxylic acid amides, phosphoric acid amides, sulfoxides, carboxylate esters, phosphates, ethers, and nitriles, and may be used in a range compatible with water.

<Water-Soluble Polyvalent Metal Compound (E)>

The water-soluble polyvalent metal compound (E) in the present invention is a metal compound which becomes a divalent or higher metal ion in an aqueous solution.

Examples of the water-soluble polyvalent metal compound include compounds formed by combining a cationic metal ion such as $Ba^{2+}$, $Mg^{2+}$, $Ca^{3+}$, $Sr^{2+}$, $Ni^{2+}$, $Zn^{2+}$, $Cu^{2+}$, $Fe^{2+}$, $Co^{2+}$, $Sn^{2+}$, $Mn^{2+}$, $Al^{3+}$, $Fe^{3+}$, $Cu^{3+}$, $Cr^{3+}$, or $Sn^{4+}$ with an anionic ion such as a hydroxide ion ($OH^-$), a carbonate ion ($CO_3^{2-}$), a nitrate ion ($NO_3^-$), a nitrite ion ($NO_2^-$), a sulfate ion ($SO_4^{2-}$), a phosphate ion ($PO_4^{3-}$), a hydrogen phosphate ion ($HPO_4^{2-}$), an acetate ion ($C_2H_3O_2^-$), a cyanide ion ($CN^-$), a thiocyanate ion ($SCN_2^-$), a fluoride ion ($F^-$), a hexafluorosilicate ion ($SiF_6^{2-}$), a chloride ion ($Cl^-$), a chlorate ion ($ClO_3^-$), a chlorite ion ($ClO_2^-$), a perchlorate ion ($ClO^-$) a bromide ion ($Br^-$), a bromate ion ($BrO_3^-$), a permanganate ion ($MnO_4^-$), a chromate ion ($CrO_4^{2-}$), a formate ion ($HCO_2^-$), a benzoate ion ($C_7H_5O_2^-$), an oxalate ion ($C_2O_4^{2-}$), or a tartrate ion ($C_4H_4O_6^{2-}$), but are not limited thereto, and may be used in combination of two or more kinds thereof.

By bonding of the olefin resin fine particles (C) contained in the water-dispersible resin fine particles via the water-soluble polyvalent metal, an effect of cutting contact between the conductive carbon materials due to volume expansion of the olefin resin can be enhanced when the internal temperature of a battery rises.

As the water-soluble polyvalent metal, a divalent, trivalent, or tetravalent metal ion is preferably used, a divalent or trivalent metal ion is more preferably used, and a divalent metal ion is still more preferably used. By using a divalent metal ion, beaded aggregated particles are formed. Therefore, it is considered that an effect of volume expansion on the addition amount of the olefin resin fine particles is further enhanced.

A magnesium or calcium compound is particularly preferably used from viewpoints of availability and battery performance.

Examples of a method for adding the water-soluble polyvalent metal compound include the following methods. By adding a water-soluble polyvalent metal ion to the water-dispersible olefin resin fine particles contained in the water-dispersible resin fine particles (C), the particles are bonded via the polyvalent metal ion, and water-dispersible aggregated fine particles can be formed. The water-dispersible aggregated fine particles may be added to a slurry obtained by mechanically dispersing the conductive carbon material (A), the aqueous liquid medium (D), and the water-soluble resin (B). Water-dispersible olefin resin fine particles may be added to a slurry obtained by mechanically dispersing the conductive carbon material (A), an aqueous solution of a water-soluble polyvalent metal compound, the aqueous liquid medium (D), and the water-soluble resin (B). Water-dispersible olefin resin fine particles may be added to a slurry obtained by adding an aqueous solution of a water-soluble polyvalent metal compound to a slurry obtained by mechanically dispersing the conductive carbon material (A), the water-soluble resin (B), and the aqueous liquid medium (D) and mechanically dispersing the resulting mixture.

As described above, even when the method for adding an aqueous solution of a water-soluble polyvalent metal compound is changed, when the internal temperature of a battery rises, an effect of cutting contact between the conductive carbon materials due to volume expansion of the olefin resin is almost the same. It is considered that the water-dispersible particles aggregate via a polyvalent metal ion even when the addition method is changed.

In the method for adding a water-soluble polyvalent metal ion to the water-dispersible olefin resin fine particles contained in the water-dispersible resin fine particles (C), an aggregated particle diameter can be measured, and therefore it is easy to control the aggregated particle diameter in manufacturing. However, in order to suppress gelling due to excessive aggregation of particles, in many cases, the water-dispersible olefin resin fine particles are diluted to a certain solid content and then a polyvalent metal ion aqueous solution is added. A concentration step is added as necessary, and a manufacturing process may be added. Meanwhile, in the method for adding a water-soluble polyvalent metal ion to a slurry, the above concentration step is not necessary in many cases, but it is difficult to control a particle diameter in manufacturing. A manufacturing method can be selectively used as necessary from the above point of view.

In the present invention, a ratio CV2/CV1 between a volume average particle diameter (CV1) of the water-dispersible olefin resin fine particles contained in the water-dispersible resin fine particles (C) and a volume average particle diameter (CV2) of the water-dispersible aggregated fine particles formed of water-dispersible olefin resin fine particles and the water-soluble polyvalent metal compound (E) is preferably 1.1 to 5.0, and more preferably 1.2 to 4.0 from viewpoints of productivity, stability of the water-dispersible aggregated fine particles, and internal resistance of a battery.

<Other Additives>

A surfactant, a film forming aid, a defoaming agent, a leveling agent, a preservative, a pH adjusting agent, a viscosity adjusting agent, and the like can be further added to the conductive composition as necessary.

A surfactant used in the present invention is not particularly limited as long as being able to disperse a conductive carbon material. However, examples of a nonionic surfactant include an ester type surfactant such as a glycerin fatty acid ester and an ether type surfactant such as polyoxyethylene alkyl phenylether. Examples of an ionic surfactant include a monoalkyl sulfate and an alkylbenzene sulfonate as an anionic surfactant, and a dialkyl dimethyl ammonium salt and an alkylbenzyldimethylammonium salt as a cationic surfactant. However, the surfactant is not limited thereto, and two or more kinds thereof may be used in combination.

<Dispersing Machine/Mixing Machine>

As an apparatus used for obtaining the conductive composition of the present invention and a mixture ink described below, a dispersing machine and a mixing machine usually used for pigment dispersion or the like can be used.

Examples thereof include a mixer such as a disper, a homomixer, or a planetary mixer; a homogenizer such as "CLEAR MIX" manufactured by M Technique Co., Ltd. or "FILMIX" manufactured by PRIMIX Co., Ltd.; a media type dispersing machine such as a paint conditioner (manufactured by Red Devil, Inc.), a ball mill, a sand mill (DYNO-MILL manufactured by Shinmaru Enterprises Corporation), an attritor, a pearl mill ("DCP mill" manufactured by Eirich Co.), or a coball mill; a media-less dispersing machine such as a wet type jet mill ("Genus PY" manufactured by Genus, Inc., "Starburst" manufactured by Sugino Machine Limited, or "Nanomizer" manufactured by Nanomizer Co., Ltd.), "Clea SS-5" manufactured by M Technique Co., Ltd., or "MICROS" manufactured by Nara Machinery Co., Ltd.; and a roll mill, but are not limited thereto. In addition, as the dispersing machine, a dispersing machine which has been subjected to a treatment for preventing metal contamination thereinto is preferably used.

For example, in a case of using a media type dispersing machine, a method using a dispersing machine in which an agitator and a vessel are made of a ceramic or a resin, or a dispersing machine in which a metal agitator and a vessel surface have been subjected to a treatment such as tungsten carbide spraying or resin coating is preferably used. As the media, a glass bead or a ceramic bead such as a zirconia bead or an alumina bead is preferably used. In a case of using a roll mill, a ceramic roll is preferably used. Only one kind of dispersing apparatus may be used, or a plurality of kinds of apparatuses may be used in combination. In a case of a positive or negative electrode active material in which particles are easily cracked or crushed due to a strong impact, a media-less dispersing machine such as a roll mill or a homogenizer is more preferable than a media type dispersing machine.

The conductive composition of the present invention can be manufactured by applying appropriate shearing or impact with the above dispersing machine or the like. When excessive shearing or impact is applied, the secondary aggregate of the conductive carbon material is crushed, the internal resistance of a battery during normal operation increases, and the internal resistance at the time of rising in the internal temperature of the battery does not sufficiently increase in some cases.

<Gloss Value of Coating Film>

The size of a secondary aggregate of carbon black in the conductive composition can be evaluated by gloss of a coating film. As the secondary aggregate is smaller, a gloss value of the coating film is larger. A coating film obtained by applying the conductive composition onto a PET (polyethylene terephthalate) film and drying the conductive composition can be measured by a gloss meter (60°). Specifically, the gloss value of the coating film of the conductive composition is 0.1 to 55, preferably 0.1 to 45, more preferably 0.1 to 40, and still more preferably 0.1 to 30. When the gloss value is high, the secondary aggregate of carbon black is small. Therefore, the internal resistance of a battery during normal operation increases, and the internal resistance at the time of rising in the internal temperature of the battery does not sufficiently increase in some cases.

In the present invention, the gloss value of the coating film of the conductive composition can be measured as follows. A PET (polyethylene terephthalate) film is coated with the manufactured conductive composition so as to have a thickness of about 3 µm, and then the film is put in an oven at 150° C. for two to five minutes to manufacture a coating film. This coating film is placed on a black flat plate and measured with a gloss meter (micro-TRI-gloss manufactured by BYK Co., Ltd.). In the present invention, a value of 60° is read and taken as a gloss value. In measurement of gloss of a coating film, a coating film in which coating has been performed on a PET film is preferably measured, but a coating film in which coating has been performed on an Al foil or the like may be measured.

<Current Collector with Base Layer for Electric Storage Device and Electrode for Electric Storage Device>

The current collector with a base layer for an electric storage device of the present invention includes a base layer formed from the conductive composition of the present invention on the current collector. In addition, the electrode for an electric storage device of the present invention includes abase layer formed from the conductive composition of the present invention, and a mixture layer formed from an electrode-forming composition (mixture ink) containing an electrode active material and a binder on the current collector.

<Current Collector>

A material and a shape of the current collector used for an electrode are not particularly limited, and those suitable for various electric storage devices can be appropriately selected. Examples of the material of the current collector include a metal such as aluminum, copper, nickel, titanium, or stainless steel, and an alloy. In a case of a lithium ion battery, particularly, aluminum is preferable as a positive electrode material and copper is preferable as a negative electrode material. As a shape, foil on a flat plate is generally used, but a current collector having a surface roughened, a perforated foil-shaped current collector, or a mesh current collector can be used.

A method for coating a current collector with the conductive composition or a mixture ink described below is not particularly limited, and a known method can be used. Specific examples thereof include a die coating method, a dip coating method, a roll coating method, a doctor coating method, a knife coating method, a spray coating method, a gravure coating method, a screen printing method, and an electrostatic coating method. As a drying method, leaving drying, an air dryer, a hot air dryer, an infrared heater, a far infrared heater, and the like can be used. However, without being limited thereto, a rolling treatment with a lithographic press, a calender roll, or the like may be performed after application.

The thickness of the base layer is preferably 0.1 to 10 µm, more preferably 0.5 to 5 µm, and still more preferably 0.5 to 3 µm. When the thickness of the base layer is too thin, a bypass portion in which the current collector and an active material are in direct contact is locally formed. When a battery generates heat, an effect of cutting off a current due to an increase in resistance of the base layer portion is insufficient. Meanwhile, when the thickness of the base layer is too thick, a ratio of the base layer with respect to an electrode increases, a content ratio of an active material decreases, and a capacity of a battery decreases.

The base layer can be disposed on one side or both sides of the current collector, but is preferably disposed on both sides of the current collector from viewpoints of an increase in resistance due to heat and reduction in internal resistance of a battery.

<Mixture Ink>

As described above, a mixture ink for a general electric storage device essentially contains an active material and a solvent, and contains a conductive aid and a binder as necessary.

The active material is preferably contained as much as possible. For example, a ratio of the active material with respect to a solid content of the mixture ink is preferably 80 to 99% by mass. In a case of containing a conductive aid, a ratio of the conductive aid with respect to a solid content of the mixture ink is preferably 0.1 to 15% by mass. In a case of containing a binder, a ratio of the binder with respect to a solid content of the mixture ink is preferably 0.1 to 15% by mass.

Although depending on a coating method, the viscosity of the mixture ink is preferably 100 mPa·s or more and 30,000 mPa·s or less in a range of a solid content of 30 to 90% by mass.

A solvent (dispersion medium) of the mixture ink is not particularly limited, but can be used properly according to a binder to be used. For example, when a resin type binder is used, a solvent capable of dissolving a resin is used. When an emulsion type binder is used, a solvent capable of maintaining dispersion of an emulsion is preferably used. Examples of the solvent include amides such as dimethylformamide, dimethylacetamide, and methylformamide, amines such as N-methyl-2-pyrrolidone (NMP) and dimethylamine, ketones such as methyl ethyl ketone, acetone, and cyclohexanone, alcohols, glycols, cellosolves, amino alcohols, sulfoxides, carboxylate esters, phosphates, ethers, nitriles, and water. Two or more kinds of the above solvents may be used in combination as necessary. For example, when polyvinylidene fluoride (PVDF) is used as a binder, NMP capable of dissolving PVDF is preferably used. When carboxymethyl cellulose (CMC) and styrene butadiene rubber (SBR) are used as a binder, water capable of dissolving CMC and maintaining dispersion of SBR is preferably used.

The active material used in the mixture ink will be described below.

A positive electrode active material for a lithium ion secondary battery is not particularly limited, but examples thereof include a metal compound such as metal oxide or metal sulfide capable of being doped or intercalated with lithium ions, and a conductive polymer.

Examples thereof include oxides of transition metals such as Fe, Co, Ni, and Mn, complex oxides with lithium, and inorganic compounds such as transition metal sulfides. Specific examples thereof include a transition metal oxide powder such as $MnO$, $V_2O_5$, $V_6O_{13}$, or $TiO_2$, a powder of a composite oxide of lithium and a transition metal, such as lithium nickelate, lithium cobalate, and lithium manganate each having a layered structure, or lithium manganate having a spinel structure, a lithium iron phosphate material which is a phosphoric acid compound having an olivine structure, and a transition metal sulfide powder such as $TiS_2$ or FeS.

Conductive polymers such as polyaniline, polyacetylene, polypyrrole, and polythiophene can also be used. In addition, the above inorganic compounds and the conductive polymers may be mixed and used.

A negative electrode active material for a lithium ion secondary battery is not particularly limited as long as being able to be doped or intercalated with lithium ions. Examples thereof include metal Li, alloys thereof such as tin alloy, silicon alloy, and lead alloy, metal oxides such as $Li_xFe_2O_3$, $Li_xFe_3O_4$, $Li_xWO_2$, lithium titanate, lithium vanadate, and lithium silicate, conductive polymers such as polyacetylene and poly-p-phenylene, amorphous carbonaceous materials such as soft carbon and hard carbon, a carbonaceous powder such as artificial graphite including a highly graphitized carbon material or natural graphite, and carbon materials such as carbon black, mesophase carbon black, a resin-baked carbon material, a vapor-grown carbon fiber, and a carbon fiber. These negative electrode active materials can be used singly or in combination of two or more kinds thereof.

An electrode active material for an electric double layer capacitor is not particularly limited, but examples thereof include activated carbon, polyacene, carbon whisker, and graphite, and also include powders and fibers thereof. A preferable electrode active material for an electric double layer capacitor is activated carbon, and specific examples thereof include phenol type activated carbon, coconut type activated carbon, rayon type activated carbon, acrylic activated carbon, coal/petroleum type pitch coke, and activated carbon activated with mesocarbon micro beads (MCMB) or the like. Activated carbon having a large specific surface area, capable of forming an interface with a larger area even with the same weight is preferable. Specifically, the specific surface area is preferably 30 $m^2/g$ or more, more preferably 500 to 5000 $m^2/g$, and still more preferably 1000 to 3000 $m^2/g$.

These electrode active materials can be used singly or in combination of two or more kinds thereof, and two or more kinds of carbons having different average particle diameters or different particle size distributions may be used in combination.

A positive electrode active material for a lithium ion capacitor is not particularly limited as long as being a material capable of being reversibly doped/dedoped with lithium ions and anions, but examples thereof include an activated carbon powder. A volume average particle diameter (D50) of the activated carbon is preferably 0.1 μm to 20 μm. The volume average particle diameter (D50) referred to herein is as described above.

A negative electrode active material for a lithium ion capacitor is not particularly limited as long as being a material capable of being reversibly doped/dedoped with lithium ions, but examples thereof include a graphite material such as artificial graphite or natural graphite. A volume average particle diameter (D50) of the graphite material is preferably 0.1 μm to 20 μm. The volume average particle diameter (D50) referred to herein is as described above.

The conductive aid in the mixture ink is not particularly limited as long as being a conductive carbon material, and those similar to the above conductive carbon material (A) can also be used.

The binder in the mixture ink is used in order to bind particles of an active material, a conductive carbon material, or the like to each other, or to bind a conductive carbon material to a current collector.

Examples of the binder used in the mixture ink include an acrylic resin, a polyurethane resin, a polyester resin, a phenol resin, an epoxy resin, a phenoxy resin, a urea resin, a melamine resin, an alkyd resin, a formaldehyde resin, a silicone resin, a fluororesin, a cellulose resin such as carboxymethyl cellulose, synthetic rubbers such as a styrene-butadiene rubber or a fluororubber, conductive resins such as polyaniline and polyacetylene, and polymer compounds containing a fluorine atom, such as polyvinylidene fluoride, polyvinyl fluoride, and tetrafluoroethylene. Modified products, mixtures, or copolymers of these resins may also be used. These binders can be used singly or in combination of two or more kinds thereof.

As a binder suitably used in an aqueous mixture ink, an aqueous medium is preferable. Examples of a form of the aqueous medium binder include a water-soluble binder, an emulsion binder, and a hydrosol binder, and can be appropriately selected.

A film-forming aid, a defoaming agent, a leveling agent, a preservative, a pH adjusting agent, a viscosity adjusting agent, and the like can be further added to the mixture ink as necessary.

<Method for Manufacturing Electrode>

A current collector is coated with the conductive composition of the present invention, the conductive composition is dried to form a base layer, and an electrode with a base layer for an electric storage device can be obtained.

Alternatively, a current collector is coated with the conductive composition of the present invention, the conductive composition is dried to form a base layer, a mixture layer is disposed on the base layer, and an electrode for an electric storage device can be obtained. The mixture layer disposed on the base layer can be formed using the above mixture ink.

<Electric Storage Device>

An electric storage device such as a secondary battery or a capacitor can be obtained using the above electrode for at least one of a positive electrode and a negative electrode.

Examples of the secondary battery include a sodium ion secondary battery, a magnesium ion secondary battery, an alkaline secondary battery, a lead storage battery, a sodium sulfur secondary battery, and a lithium air secondary battery in addition to a lithium ion secondary battery. An electrolytic solution, a separator, and the like conventionally known for each of these secondary batteries can be used appropriately.

Examples of the capacitor include an electric double layer capacitor and a lithium ion capacitor. An electrolytic solution, a separator, and the like conventionally known for each of these capacitors can be used appropriately.

<Electrolytic Solution>

A case of a lithium ion secondary battery will be described as an example. As the electrolytic solution, a solution obtained by dissolving a lithium-containing electrolyte in a nonaqueous solvent is used.

Examples of the electrolyte include $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, $LiI$, $LiBr$, $LiCl$, $LiAlCl$, $LiHF_2$, $LiSCN$, and $LiBPh_4$, but are not limited thereto.

The nonaqueous solvent is not particularly limited, but examples thereof include carbonates such as ethylene carbonate, propylene carbonate, butylene carbonate, dimethyl carbonate, ethyl methyl carbonate, and diethyl carbonate;

lactones such as γ-butyrolactone, γ-valerolactone, and γ-octanoic lactone;

grimes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane;

esters such as methyl formate, methyl acetate, and methyl propionate; sulfoxides such as dimethyl sulfoxide and sulfolane; and nitriles such as acetonitrile. These solvents may be used singly or in combination of two or more kinds thereof.

Furthermore, a polymer electrolyte obtained by holding the above electrolytic solution in a polymer matrix to form a gel can be used. Examples of the polymer matrix include an acrylate resin having a polyalkylene oxide segment, a polyphosphazene resin having a polyalkylene oxide segment, and a polysiloxane having a polyalkylene oxide segment, but are not limited thereto.

<Separator>

Examples of the separator include a polyethylene nonwoven fabric, a polypropylene nonwoven fabric, a polyamide nonwoven fabric, and those obtained by subjecting these nonwoven fabrics to a hydrophilic treatment, but are not particularly limited thereto.

Structures of a lithium ion secondary battery, an electric double layer capacitor, and a lithium ion capacitor using the conductive composition of the present invention are not particularly limited, but are usually constituted by a positive electrode, a negative electrode, and a separator disposed as necessary. The structures can be formed into various shapes according to a purpose of use, such as a paper shape, a cylindrical shape, a button shape, and a laminated shape.

EXAMPLES

First, materials used in Examples and Comparative Examples are described below.

(Conductive Carbon Material (A))

A-1: Denka Black HS-100 (manufactured by Denki Kagaku Kogyo KK)

A-2: Ketjen Black EC-300J (manufactured by Lion Corporation)

(Water-Soluble Resin (B))

B-1: CMC Daicel #1240 (manufactured by Daicel Corporation)

B-2: Sodium polyacrylate, average molecular weight 5000 (manufactured by Wako Pure Chemical Industries, Ltd.)

B-3: Kuraray Poval PVA 235 (manufactured by Kuraray Co., Ltd.)

B-4: CMC Daicel #1110 (manufactured by Daicel Corporation.)

B-5: CMC Daicel #1120 (manufactured by Daicel Corporation)

B-6: CMC Daicel #1130 (manufactured by Daicel Corporation)

B-7: CMC Daicel #1140 (manufactured by Daicel Corporation)

B-8: CMC Daicel #1260 (manufactured by Daicel Corporation)

B-9: Sodium polyacrylate, average molecular weight 10000 (manufactured by Wako Pure Chemical Industries, Ltd.)

(Water-Dispersible Resin Particles (C))

C-1: Arrow base SB-1200 (solid content 25% aqueous dispersion, volume average particle diameter (MV) 0.16 μm, modification amount (Y)/(X) 0.58, polyethylene (manufactured by Unitika Ltd.)

C-2: Arrow base TC-4010 (solid content 25% aqueous dispersion, volume average particle diameter (MV) 0.26 μm, modification amount (Y)/(X) 0.14, polypropylene) (manufactured by Unitika Ltd.)

C-3: Aquapetro DP-2401 (solid content 30% aqueous dispersion, volume average particle diameter (MV) 0.40 μm, not modified, polyethylene) (manufactured by Toyo ADL Corporation)

C-4: Polytetrafluoroethylene 30-J (solid content 60% aqueous dispersion, volume average particle diameter (MV) 0.2 μm) (manufactured by Du Pont-Mitsui Fluorochemicals Company, Ltd.)

C-5: TRD 2001 (solid content 48% aqueous dispersion) (manufactured by JSR Corporation)

C-6: ZeiksenAC (solid content 30% aqueous dispersion, volume average particle diameter (MV) 0.10 μm, modification amount (Y)/(X) 0.64, polyethylene) (manufactured by Sumitomo Seika Chemicals Co., Ltd.)

C-7: Arrow base SE-1200 (solid content 20% aqueous dispersion, volume average particle diameter (MV) 0.11 μm, modification amount (Y)/(X) 0.37, polyethylene) (manufactured by Unitika Ltd.)

C-8: Hightech S-3121 (solid content 25% aqueous dispersion, volume average particle diameter (MV) 0.01 μm, modification amount (Y)/(X) 0.62, polyethylene (manufactured by Toho Chemical Industry Co., Ltd.)

C-9: Chemipearl V300 (solid content 40% aqueous dispersion, volume average particle diameter (MV) 3.69 μm, modification amount (Y)/(X) 0.54, polyethylene (manufactured by Mitsui Chemicals, Inc.)

C-10: Chemipearl 5100 (solid content 28% aqueous dispersion, volume average particle diameter (MV) 0.02 μm, modification amount (Y)/(X) 0.13, polyethylene) (manufactured by Mitsui Chemicals, Inc.)

C-11: Chemipearl W4005 (solid content 40% aqueous dispersion, volume average particle diameter (MV) 0.57 μm, not modified, polyethylene) (manufactured by Mitsui Chemicals, Inc.)

C-12: Arrow base TD-4010 (solid content 25% aqueous dispersion, volume average particle diameter (MV) 0.21 μm, modification amount (Y)/(X) 0.09, polypropylene) (manufactured by Unitika Ltd.)

C-13: Hardren NZ-1015 (solid content 30% aqueous dispersion, volume average particle diameter (MV) 0.18 μm, modification amount (Y)/(X) 0.05, polypropylene) (manufactured by Toyobo Co., Ltd.)

C-14: Hardren NZ-1004 (solid content 30% aqueous dispersion, volume average particle diameter (MV) 0.14 μm, modification amount (Y)/(X) 0.03, polypropylene) (manufactured by Toyobo Co., Ltd.)

(Water-Soluble Polyvalent Metal Compound (E))

E-1: Calcium nitrate tetrahydrate ($Ca(NO_3)_2 \cdot 4H_2O$)
E-2: Magnesium nitrate hexahydrate ($Mg(NO_3)_2 \cdot 6H_2O$)
E-3: Nickel (II) nitrate hexahydrate ($Ni(NO_3)_2 \cdot 6H_2O$)
E-4: Iron (III) nitrate nonahydrate ($Fe(NO_3)_3 \cdot 9H_2O$)
E-5: Manganese (II) nitrate hexahydrate ($Mn(NO_3)_2 \cdot 6H_2O$)
E-6: Aluminum nitrate nonahydrate ($Al(NO_3)_3 \cdot 9H_2O$)
E-7: Tin (II) chloride dihydrate ($SnCl_2 \cdot 2H_2O$)

The water-soluble polyvalent metal compound was dissolved by adding deionized water so as to obtain a metal ion concentration of 10% by mass, and each aqueous solution was adjusted and used.

(Optional Component (F))

F-1: Cell roll nanofiber (fiber diameter 20 nm, fiber length 2000 nm)
F-2: Snowtex N (solid content 20% aqueous dispersion, average particle diameter 12 nm) (manufactured by Nissan Chemical Industries, Ltd.)

Example 1

<Conductive Composition>

25 parts by mass of acetylene black (A-1: Denka Black HS-100, manufactured by Denki Kagaku Kogyo KK) as a conductive carbon material and 1000 parts by mass (25 parts by mass as a solid content) of a 2.5% aqueous solution of carboxymethyl cellulose (B-1: CMC Daicel #1240, manufactured by Daicel Corporation) as a water-soluble resin were put in a mixer to be mixed, and were further dispersed in a sand mill. Subsequently, 200 parts by mass (50 parts by mass as a solid content) of polyolefin resin fine particles (C-1: Arrow base SB-1200, manufactured by Unitika Ltd., 25% aqueous dispersion (volume average particle diameter 0.16 μm)) as water-dispersible resin particles was put therein, and the resulting mixture was mixed with a mixer to obtain conductive composition (1).

Examples 2 to 50

Conductive compositions (2) to (16), (18) to (20), and (25) to (54) in Examples were obtained by a method similar to that of conductive composition (1) except that the composition ratios indicated in Tables 1A to 1C were used and gloss values of conductive materials were changed by extending dispersion time of a conductive carbon material and a water-soluble resin in a sand mill.

Comparative Example 2

Conductive composition (22) was obtained in a similar manner to Example 1 except that the water-dispersible resin fine particles were replaced with a styrene butadiene emulsion (C-5: TRD 2001 (solid content 48% aqueous dispersion), manufactured by JSR Corporation).

Comparative Example 3

30 parts by mass of acetylene black (A-1: Denka Black HS-100, Denki Kagaku Kogyo KK) as a conductive carbon material, 35 parts by mass of polyvinylidene fluoride (KF Polymer #9100: Kureha Co., Ltd.) as a water-insoluble resin, and 900 parts by mass of N-methylpyrrolidone were put in a mixer to be mixed. Thereafter, 35 parts by mass of a solid polyolefin resin having a melting point of 130° C. and a density of 0.98 g/ml was added thereto, and the resulting mixture was put in an oven at 160° C. to dissolve the polyolefin resin. Thereafter, the resulting product was dispersed in a sand mill to obtain conductive composition (23).

Comparative Example 4

28 parts by mass of acetylene black (A-1: Denka Black HS-100, Denki Kagaku Kogyo KK) as a conductive carbon material, 72 parts by mass of polyvinylidene fluoride (KF polymer #9100: Kureha Co., Ltd.) as a water-insoluble resin, and 900 parts by mass of N-methylpyrrolidone were put in a mixer to be mixed, and were further dispersed in a sand mill to obtain conductive composition (24).

<Current Collector with Base Layer> (Examples 1 to 19 and 21 to 50, and Comparative Examples 1 to 3)

Conductive compositions (1) to (19), (25) to (54), (22), and (23) were each applied onto an aluminum foil having a thickness of 20 μm as a current collector using a bar coater, and then were heated and dried at 80° C. to obtain current collectors with a base layer for a nonaqueous electrolyte secondary battery (1) to (19), (25) to (54), (22), and (23) so as to have the thicknesses indicated in Tables 1A to 1C (thickness 2 μm in Comparative Example 3), respectively. Note that the current collector in Comparative Example 1 was formed only of an aluminum foil having no base layer.

<Current Collector with Base Layer> (Example 20)

Conductive composition (20) was applied onto a copper foil having a thickness of 20 μm as a current collector using a bar coater, and then was heated and dried at 80° C. to obtain current collector with a base layer for a nonaqueous electrolyte secondary battery (20) so as to have a thickness of 2 μm.

<Current Collector with Base Layer> (Comparative Example 4)

Conductive composition (24) was applied onto an aluminum foil having a thickness of 20 μm as a current collector using a bar coater so as to have a thickness of 2 μm, and then was heated and dried at 80° C. Subsequently, the resulting product was put in an oven at 145° C. and was heated for five hours to obtain current collector with a base layer for a nonaqueous electrolyte secondary battery (24).

Evaluation of the materials and coating films used in Examples and Comparative examples was performed as follows.

(Gloss Value)

A PET (polyethylene terephthalate) film was coated with the manufactured conductive composition so as to have a thickness of about 3 μm, and then the film was put in an oven at 150° C. for two to five minutes to manufacture a coating film. This coating film was placed on a black flat plate, and a value at 60° was read with a gloss meter (micro-TRI-gloss manufactured by BYK Co., Ltd.).
(Primary Particle Diameter of Conductive Carbon Material)

Carbon material particles were photographed at an acceleration voltage of 100 kV using a transmission electron microscope (JEM-1010 manufactured by JEOL Datum Co., Ltd.). Diameters of 100 spherical particles forming an aggregate (primary aggregate) were measured and averaged.
(Volume Average Particle Diameter of Conductive Carbon Material)

A slurry obtained by mechanically dispersing the conductive carbon material (A) and the water-soluble resin (B) was diluted 100 to 1000 times with water according to a solid content, and the diluted slurry was injected into a cell of Microtrack (MT3300 EXII manufactured by Nikkiso Co.) until reaching an appropriate concentration in sampling loading. Conditions for a refractive index of a dispersion medium (water in the present invention) corresponding to a sample were input, then measurement was performed, and D50 was taken as an average particle diameter.
(Volume Average Particle Diameter of Water-Dispersible Resin Fine Particles)

A dispersion of water-dispersible resin fine particles was diluted 200 to 1000 times with water according to a solid content. Approximately 5 ml of the diluted solution was injected into a cell of Nanotrac (Wave-EX 150 manufactured by Nikkiso Co., Ltd.). Conditions for a refractive index of a dispersion medium (water in the present invention) corresponding to a sample and the resin were input, then measurement was performed, and a volume average particle diameter (MV) was taken as an average particle diameter.

Note that a volume average particle diameter of the water-dispersible olefin resin fine particles before addition of a polyvalent cation is represented by CV1, and a volume average particle diameter of the water-dispersible aggregated fine particles after addition of a polyvalent cation is represented by CV2.
(Modification Amount (Y)/(X) of Olefin Resin Fine Particles)

The water-dispersible resin fine particles (C) were put in an oven at 80° C., the dispersion medium was removed, and then the resulting product was dried at 120° C. for 30 minutes to obtain a solid. This solid was measured by a total reflection measurement method (ATR) with a Fourier transform infrared spectrometer (FT-IR: Spectrum One/100 manufactured by PerkinElmer).

The modification amount was determined by a ratio (Y)/(X) in which, using a spectrum obtained by plotting absorbance with respect to the wave number, (X) was a height (maximum absorbance) from a maximum peak derived from olefin at 2800 to 3000 $cm^{-1}$ to a baseline BX when a straight line connecting a point indicating absorbance at 2700 $cm^{-1}$ and a point indicating absorbance at 3000 $cm^{-1}$ was taken as the baseline BX, and (Y) was a height (maximum absorbance) from a maximum peak derived from carbonyl at 1690 to 1740 $cm^{-1}$ to a baseline BY when a straight line connecting a point indicating absorbance at 1650 $m^{-1}$ and a point indicating absorbance at 1850 $cm^{-1}$ was taken as the baseline BY.

TABLE 1A

| | | Conductive composition | | | | | | |
|---|---|---|---|---|---|---|---|---|
| | | Conductive carbon material (A) | | | | Water soluble resin (B) | | Water-dispersible resin fine particles (C) |
| Ex. | | Addition amount | Gloss value | Primary particle diameter (nm) | Volume particle diameter (μm) | | Addition amount | Olefin resin fine particle |
| 1 | (1) | A-1 | 25 | 1 | 45 | 1.4 | B-1 | 25 | C-1 | PE |
| 2 | (2) | A-1 | 35 | 1 | 45 | 1.4 | B-1 | 15 | C-1 | PE |
| 3 | (3) | A-1 | 35 | 1 | 45 | 1.4 | B-1 | 25 | C-1 | PE |
| 4 | (4) | A-1 | 25 | 1 | 45 | 1.4 | B-1 | 35 | C-1 | PE |
| 5 | (5) | A-1 | 10 | 1 | 45 | 1.4 | B-1 | 40 | C-1 | PE |
| 6 | (6) | A-2 | 10 | 24 | 40 | 0.4 | B-1 | 50 | C-1 | PE |
| 7 | (7) | A-1 | 15 | 1 | 45 | 1.4 | B-1 | 35 | C-1 | PE |
| 8 | (8) | A-2 | 15 | 24 | 40 | 0.4 | B-1 | 35 | C-1 | PE |
| 9 | (9) | A-1 | 60 | 1 | 45 | 1.4 | B-1 | 5 | C-1 | PE |
| 10 | (10) | A-1 | 40 | 1 | 45 | 1.4 | B-1 | 40 | C-1 | PE |
| 11 | (11) | A-1 | 15 | 1 | 45 | 1.4 | B-1 | 15 | C-1 | PE |
| 12 | (12) | A-1 | 25 | 1 | 45 | 1.4 | B-2 | 25 | C-1 | PE |
| 13 | (13) | A-1 | 25 | 1 | 45 | 1.4 | B-3 | 25 | C-1 | PE |
| 14 | (14) | A-1 | 25 | 1 | 45 | 1.4 | B-1 | 25 | C-2 | PP |
| 15 | (15) | A-1 | 25 | 1 | 45 | 1.4 | B-1 | 25 | C-3 | PE |
| 16 | (16) | A-1 | 25 | 1 | 45 | 1.4 | B-1 | 25 | C-1 | PE |
| 18 | (18) | A-1 | 25 | 1 | 45 | 1.4 | B-1 | 25 | C-1 | PE |
| 19 | (19) | A-1 | 25 | 1 | 45 | 1.4 | B-1 | 25 | C-1 | PE |
| 20 | (20) | A-1 | 25 | 1 | 45 | 1.4 | B-1 | 25 | C-1 | PE |
| Com. Ex. 1 | — | | | | | — | | — | | — |
| Com. Ex. 2 | (22) | A-1 | 25 | 1 | 45 | 1.4 | B-1 | 25 | — |

TABLE 1A-continued

| | Conductive composition Water-dispersible resin fine particles (C) | | | | | Current collector with base layer | | |
|---|---|---|---|---|---|---|---|---|
| Ex. | Addition amount | Volume particle diameter (μm) | Modification amount | Non olefin resin fine particle | Addition amount | | Current collector | Base layer thickness (μm) |
| 1 | 50 | 0.16 | 0.58 | — | — | (1) | Al | 2 |
| 2 | 50 | 0.16 | 0.58 | — | — | (2) | Al | 2 |
| 3 | 40 | 0.16 | 0.58 | — | — | (3) | Al | 2 |
| 4 | 40 | 0.16 | 0.58 | — | — | (4) | Al | 2 |
| 5 | 50 | 0.16 | 0.58 | — | — | (5) | Al | 2 |
| 6 | 40 | 0.16 | 0.58 | — | — | (6) | Al | 2 |
| 7 | 50 | 0.16 | 0.58 | — | — | (7) | Al | 2 |
| 8 | 50 | 0.16 | 0.58 | — | — | (8) | Al | 2 |
| 9 | 35 | 0.16 | 0.58 | — | — | (9) | Al | 2 |
| 10 | 20 | 0.16 | 0.58 | — | — | (10) | Al | 2 |
| 11 | 70 | 0.16 | 0.58 | — | — | (11) | Al | 3 |
| 12 | 50 | 0.16 | 0.58 | — | — | (12) | Al | 2 |
| 13 | 50 | 0.16 | 0.58 | — | — | (13) | Al | 2 |
| 14 | 50 | 0.26 | 0.14 | — | — | (14) | Al | 2 |
| 15 | 50 | 0.40 | — | — | — | (15) | Al | 2 |
| 16 | 40 | 0.16 | 0.58 | C-4 | 10 | (16) | Al | 2 |
| 18 | 50 | 0.16 | 0.58 | — | — | (18) | Al | 0.5 |
| 19 | 50 | 0.16 | 0.58 | — | — | (19) | Al | 5 |
| 20 | 50 | 0.16 | 0.58 | — | — | (20) | Cu | 2 |
| Com. Ex. 1 | | | — | | | — | Al | — |
| Com. Ex. 2 | — | | | C-5 | 50 | (22) | Al | 2 |

TABLE 1B

| | conductive composition | | | | | | | |
|---|---|---|---|---|---|---|---|---|
| | Conductive carbon material (A) | | | | Water soluble resin (B) | | Water-dispersible resin fine particles (C) | |
| Ex. | | Addition amount | Gloss value | Primary particle diameter (nm) | Volume particle diameter (μm) | | Addition amount | Olefin resin fine particle | |
| 21 | (25) A-1 | 25 | 1 | 45 | 1.4 | B-1 | 25 | C-6 | PE |
| 22 | (26) A-1 | 25 | 1 | 45 | 1.4 | B-1 | 25 | C-7 | PE |
| 23 | (27) A-1 | 25 | 1 | 45 | 1.4 | B-1 | 25 | C-8 | PE |
| 24 | (28) A-1 | 25 | 1 | 45 | 1.4 | B-1 | 25 | C-9 | PE |
| 25 | (29) A-1 | 25 | 1 | 45 | 1.4 | B-1 | 25 | | PE |
| 26 | (30) A-1 | 25 | 1 | 45 | 1.4 | B-1 | 25 | C-11 | PE |
| 27 | (31) A-1 | 25 | 1 | 45 | 1.4 | B-1 | 25 | C-12 | PP |
| 28 | (32) A-1 | 25 | 1 | 45 | 1.4 | B-1 | 25 | C-13 | PP |
| 29 | (33) A-1 | 25 | 1 | 45 | 1.4 | B-1 | 25 | C-14 | PP |
| 30 | (34) A-1 | 25 | 9 | 45 | 0.6 | B-1 | 25 | C-1 | PE |
| 31 | (35) A-1 | 25 | 18 | 45 | 0.5 | B-1 | 25 | C-1 | PE |
| 32 | (36) A-1 | 25 | 28 | 45 | 0.4 | B-1 | 25 | C-1 | PE |
| 33 | (37) A-1 | 25 | 33 | 45 | 0.4 | B-1 | 25 | C-1 | PE |
| 34 | (38) A-1 | 25 | 24 | 45 | 0.4 | B-1 | 25 | C-1 | PE |
| 35 | (39) A-1 | 25 | 45 | 45 | 0.2 | B-1 | 25 | C-1 | PE |
| 36 | (40) A-1 | 25 | 52 | 45 | 0.2 | B-1 | 25 | C-1 | PE |
| 37 | (41) A-1 | 25 | 1 | 45 | 1.4 | B-4 | 25 | C-1 | PE |
| 38 | (42) A-1 | 25 | 1 | 45 | 1.4 | B-5 | 25 | C-1 | PE |
| 39 | (43) A-1 | 25 | 1 | 45 | 1.4 | B-6 | 25 | C-1 | PE |
| 40 | (44) A-1 | 25 | 1 | 45 | 1.4 | B-7 | 25 | C-1 | PE |
| 41 | (45) A-1 | 25 | 1 | 45 | 1.4 | B-8 | 25 | C-1 | PE |

TABLE 1B-continued

| | conductive composition Water-dispersible resin fine particles (C) | | | | | Current collector with base layer | | |
|---|---|---|---|---|---|---|---|---|
| Ex. | Addition amount | Volume particle diameter (μm) | Modification amount | Non olefin resin fine particle | Addition amount | | Current collector | Base layer thickness (μm) |
| 21 | 50 | 0.10 | 0.64 | — | — | (25) | Al | 2 |
| 22 | 50 | 0.11 | 0.37 | — | — | (26) | Al | 2 |
| 23 | 50 | 0.01 | 0.62 | — | — | (27) | Al | 2 |
| 24 | 50 | 3.69 | 0.54 | — | — | (28) | Al | 2 |
| 25 | 50 | 0.02 | 0.13 | — | — | (29) | Al | 2 |
| 26 | 50 | 0.57 | — | — | — | (30) | Al | 2 |
| 27 | 50 | 0.21 | 0.09 | — | — | (31) | Al | 2 |
| 28 | 50 | 0.18 | 0.05 | — | — | (32) | Al | 2 |
| 29 | 50 | 0.14 | 0.03 | — | — | (33) | Al | 2 |
| 30 | 50 | 0.16 | 0.58 | — | — | (34) | Al | 2 |
| 31 | 50 | 0.16 | 0.58 | — | — | (35) | Al | 2 |
| 32 | 50 | 0.16 | 0.58 | — | — | (36) | Al | 2 |
| 33 | 50 | 0.16 | 0.58 | — | — | (37) | Al | 2 |
| 34 | 50 | 0.16 | 0.58 | — | — | (38) | Al | 2 |
| 35 | 50 | 0.16 | 0.58 | — | — | (39) | Al | 2 |
| 36 | 50 | 0.16 | 0.58 | — | — | (40) | Al | 2 |
| 37 | 50 | 0.16 | 0.58 | — | — | (41) | Al | 2 |
| 38 | 50 | 0.16 | 0.58 | — | — | (42) | Al | 2 |
| 39 | 50 | 0.16 | 0.58 | — | — | (43) | Al | 2 |
| 40 | 50 | 0.16 | 0.58 | — | — | (44) | Al | 2 |
| 41 | 50 | 0.16 | 0.58 | — | — | (45) | Al | 2 |

TABLE 1C

| | conductive composition | | | | | | | | | |
|---|---|---|---|---|---|---|---|---|---|---|
| | | Conductive carbon material (A) | | | | Water soluble resin (B) | | Water-dispersible resin fine particles (C) | | |
| Ex. | | Addition amount | Gloss value | Primary particle diameter (nm) | Volume particle diameter (μm) | | Addition amount | | Olefin resin fine particle | |
| 42 | (46) | A-1 | 50 | 1 | 45 | 1.4 | B-1 | 20 | C-6 | PE |
| 43 | (47) | A-1 | 30 | 1 | 45 | 1.4 | B-1 | 10 | C-6 | PE |
| 44 | (48) | A-1 | 20 | 1 | 45 | 1.4 | B-1 | 15 | C-6 | PE |
| 45 | (49) | A-1 | 65 | 1 | 45 | 1.4 | B-1 | 25 | C-1 | PE |
| 46 | (50) | A-1 | 49 | 1 | 45 | 1.4 | B-1 | 1 | C-1 | PE |
| 47 | (51) | A-1 | 10 | 1 | 45 | 1.4 | B-1 | 20 | C-1 | PE |

| | conductive composition Water-dispersible resin fine particles (C) | | | | | Current collector with base layer | | |
|---|---|---|---|---|---|---|---|---|
| Ex. | Addition amount | Volume particle diameter (μm) | Modification amount | Non olefin resin fine particle | Addition amount | | Current collector | Base layer thickness (μm) |
| 42 | 30 | 0.10 | 0.64 | — | — | (46) | Al | 2 |
| 43 | 60 | 0.10 | 0.64 | — | — | (47) | Al | 2 |
| 44 | 35 | 0.10 | 0.64 | C-4 | 30 | (48) | Al | 2 |
| 45 | 10 | 0.16 | 0.58 | — | — | (49) | Al | 2 |
| 46 | 50 | 0.16 | 0.58 | — | — | (50) | Al | 2 |
| 47 | 70 | 0.16 | 0.58 | — | — | (51) | Al | 2 |

TABLE 1C-continued

| | | | conductive composition | | | | | | |
|---|---|---|---|---|---|---|---|---|---|
| | | | Conductive carbon material (A) | | | | Water soluble resin (B) | Water-dispersible resin fine particles (C) | |
| Ex. | | | Addition amount | Gloss value | Primary particle diameter (nm) | Volume particle diameter (μm) | Addition amount | Olefin resin fine particle | |
| 48 | (52) | A-1 | 20 | 1 | 45 | 1.4 | B-1 | 20 | C-1 PE |
| 49 | (53) | A-1 | 20 | 1 | 45 | 1.4 | B-1 | 20 | C-1 PE |
| 50 | (54) | A-1 | 10 | 1 | 45 | 1.4 | B-1 | 10 | C-1 PE |

| | conductive composition | | | | | Current collector with base layer | |
|---|---|---|---|---|---|---|---|
| | Water-dispersible resin fine particles (C) | | | Optional component (F) | | | |
| Ex. | Addition amount | Volume particle diameter (μm) | Modification amount | | Addition amount | Current collector | Base layer thickness (μm) |
| 48 | 50 | 0.16 | 0.58 | F-1 | 10 | (52) Al | 2 |
| 49 | 40 | 0.16 | 0.58 | F-1 | 20 | (53) Al | 2 |
| 50 | 30 | 0.16 | 0.58 | F-2 | 50 | (54) Al | 2 |

Incidentally, in Tables 1A to 1C, the addition amount of the carbon material A is in terms of parts by mass, and the addition amounts of the water-soluble resin B, the fine particles C, and the optional component F are in terms of parts by mass of a solid content. "PE" represents polyethylene, "PP" represents polypropylene, "Al" represents an aluminum foil, and "Cu" represents a copper foil.

<Mixture Ink for Lithium Ion Secondary Battery Positive Electrode>

93 parts by mass of $LiNi_{0.5}Mn_{0.3}CO_{0.2}O_2$ as a positive electrode active material, 4 parts by mass of acetylene black as a conductive agent, 3 parts by mass of polyvinylidene fluoride as a binder, and 45 parts by mass of N-methyl pyrrolidone were put together and mixed to manufacture a mixture ink for a positive electrode.

<Mixture Ink for Lithium Ion Secondary Battery Negative Electrode>

98 parts by mass of artificial graphite as a negative electrode active material and 66.7 parts by mass (1 part by mass as a solid content) of a 1.5% carboxymethyl cellulose aqueous solution were put in a planetary mixer and kneaded, and 33 parts by mass of water and 2.08 parts by mass of a 48% by mass aqueous styrene butadiene emulsion dispersion (1 part by mass as a solid content) were mixed to obtain a mixture ink for a negative electrode secondary battery electrode.

<Positive Electrode with Base Layer for Lithium Ion Secondary Battery> (Examples 1 to 19, 21 to 50, and Comparative Examples 2 to 4)

The above mixture ink for a lithium ion secondary battery positive electrode was applied onto current collectors with a base layer for a secondary battery (1) to (19), (25) to (54), and (22) to (24) using a doctor blade, and then was heated and dried at 80° C. to perform adjustment such that a weight per unit area of an electrode was 20 mg/cm². A rolling treatment by roll pressing was further performed to manufacture positive electrodes (1) to (19), (25) to (54), and (22) to (24) in which a mixture layer had a density of 3.1 g/cm³.

<Positive Electrode without Base Layer for Lithium Ion Secondary Battery> (Positive Electrodes for Example 20 and Comparative Example 1)

The above mixture ink for a lithium ion secondary battery positive electrode was applied onto an aluminum foil having a thickness of 20 μm as a current collector using a doctor blade, and then was heated and dried at 80° C. to perform adjustment such that a weight per unit area of an electrode was 20 mg/cm². A rolling treatment by roll pressing was further performed to manufacture positive electrodes (20) and (21) in which a mixture layer had a density of 3.1 g/cm³.

<Negative Electrode without Base Layer for Lithium Ion Secondary Battery> (Negative Electrodes for Examples 1 to 19 and 21 to 50, and Comparative Examples 1 to 4)

The above mixture ink for a lithium ion secondary battery negative electrode was applied onto a copper foil having a thickness of 20 μm as a current collector using a doctor blade, and then was heated and dried at 80° C. to perform adjustment such that a weight per unit area of an electrode was 12 mg/cm². A rolling treatment by roll pressing was further performed to manufacture negative electrodes (1) to (19), (25) to (54), and (21) to (24) in which a mixture layer had a density of 1.5 g/cm³.

<Negative Electrode with Base Layer for Lithium Ion Secondary Battery> (Example 20)

The above mixture ink for a lithium ion secondary battery negative electrode was applied onto current collector (20) with a base layer using a doctor blade, and then was heated and dried at 80° C. to perform adjustment such that a weight per unit area of an electrode was 12 mg/cm². A rolling treatment by roll pressing was further performed to manufacture negative electrode (20) in which a mixture layer had a density of 1.5 g/cm³.

<Laminate Type Lithium Ion Secondary Battery>
(Examples 1 to 50 and Comparative Examples 1 to 4)

The positive electrode and the negative electrode indicated in Tables 2A to 2C were punched into 45 mm×40 mm and 50 mm×45 mm, respectively. The positive electrode, the negative electrode, and a separator (porous polypropylene film) to be inserted therebetween were inserted into an aluminum laminate bag, and were vacuum-dried. Thereafter, an electrolytic solution (nonaqueous electrolytic solution prepared by dissolving $LiPF_6$ at a concentration of 1 M in a mixed solvent obtained by mixing ethylene carbonate and diethyl carbonate at a ratio of 1:1 (volume ratio)) was injected thereinto, and then the aluminum laminate was sealed to manufacture a laminate type lithium ion battery. The laminate type lithium ion battery was manufactured in a glove box replaced with argon gas. After the laminate type lithium ion battery was manufactured, battery characteristics of initial resistance, resistance increase, rate characteristic, and cycle characteristic described below were evaluated.
(Resistance Measurement)

A laminate type battery which had been discharged with a constant current at a discharge current of 12 mA (0.2 C) at a discharge end voltage of 3.0 V was subjected to resistance measurement at 500 kHz with an impedance analyzer (SP-50 manufactured by Biologic Corporation).

The above laminate type battery was heated from 25° C. to 180° C. and resistance measurement was performed at each temperature. Resistance measured at 25° C. was taken as initial resistance. A quotient between a resistance value measured at 180° C. and the resistance value measured at 25° C. was taken as resistance increase. That is, the resistance increase is expressed by the following (Formula 1).

$$\text{Resistance increase} = \text{resistance value at } 180° \text{C.}/\text{resistance value at } 25° \text{C.} \quad \text{(Formula 1)}$$

Results of evaluating the initial resistance and the resistance increase according to the following criteria are indicated in Tables 2A to 2C.
Initial Resistance ◯: "Initial resistance is smaller than initial resistance of Comparative Example 1 without base layer. Excellent"

Δ: "Initial resistance is equivalent to initial resistance of Comparative Example 1 without base layer."

X: "Initial resistance is larger than initial resistance of Comparative Example 1 without base layer. Poor."
Resistance Increase ⊙: "Resistance increase is 10 times or more initial resistance. Particularly excellent."

◯: "Resistance increase is five times or more and less than 10 times initial resistance. Excellent."

Δ: "Resistance increase is three times or more and less than five times initial low performance. Effect of cutting off current is insufficient."

X: "Resistance increase is less than three times initial resistance. Effect of cutting off current is low. Poor."
(Rate Characteristic)

The above laminated battery was subjected to charge and discharge measurement using a charge and discharge apparatus (SM-8 manufactured by Hokuto Denko Co., Ltd.).

Constant current constant voltage charging (cut off current 0.6 mA was performed at a charge current of 12 mA (0.2 C) at a charge end voltage of 4.2 V, then constant current discharging was performed at a discharge current of 12 mA (0.2 C) or 120 mA (2 C) until the voltage reached a discharge end voltage of 3.0 V, and discharge capacity was determined. The rate characteristic is expressed by a ratio between the 0.2 C discharge capacity and the 2 C discharge capacity, that is, the following (Formula 2).

$$\text{Rate characteristic} = 2 \text{ C discharge capacity}/0.2 \text{ C discharge capacity} \times 100(\%) \quad \text{(Formula 2)}$$

Results evaluated according to the following criteria are indicated in Tables 2A to 2C.
Rate Characteristics ◯: "Rate characteristic is 80% or more. Particularly excellent."

◯Δ: "Rate characteristic is 75% or more and less than 80%. Excellent"

Δ: "Rate characteristic is 70 or more, less than 75%. Equivalent to rate characteristic of Comparative Example 1 without base layer."

X: "Rate characteristic is less than 70%. Poor."
(Cycle Characteristic)

Constant current constant voltage charging (cut off current 0.6 mA) was performed at a charge current of 60 mA at a charge end voltage of 4.2 V in a 50° C. thermostatic chamber, then constant current discharging was performed at a discharge current of 60 mA until the voltage reached a discharge end voltage of 3.0V, and initial discharge capacity was determined. This charge and discharge cycle was repeated 200 times, and a discharge capacity retention ratio (percentage of discharge capacity at the 200th time with respect to initial discharge capacity) was calculated.

Results evaluated according to the following criteria are indicated in Tables 2A to 2C.
Cycle Characteristics ◯: "Discharge capacity retention ratio is 90% or more. Particularly excellent."

◯Δ: "Discharge capacity retention ratio is 85% or more and less than 90%. Excellent"

Δ: "Discharge capacity retention ratio is 80% or more and less than 85%. Equivalent to discharge capacity retention ratio of Comparative Example 1 without base layer."

X: "Discharge capacity retention ratio is less than 80%. Poor."

TABLE 2A

| | Positive electrode | Negative electrode | Initial resistance | Resistance increase | Rate characteristic | Cycle characteristic |
|---|---|---|---|---|---|---|
| Ex. 1 | (1) | (1) | ◯ | ◯ | ◯ | ◯ |
| Ex. 2 | (2) | (2) | ◯ | ◯ | ◯ | ◯ |
| Ex. 3 | (3) | (3) | ◯ | ◯ | ◯ | ◯ |
| Ex. 4 | (4) | (4) | ◯ | ◯ | ◯ | ◯ |
| Ex. 5 | (5) | (5) | ◯ | ◯ | ◯Δ | ◯Δ |
| Ex. 6 | (6) | (6) | ◯ | ◯ | ◯ | ◯ |
| Ex. 7 | (7) | (7) | ◯ | ◯ | ◯ | ◯ |
| Ex. 8 | (8) | (8) | ◯ | ◯ | ◯ | ◯ |
| Ex. 9 | (9) | (9) | ◯ | Δ | ◯ | ◯ |
| Ex. 10 | (10) | (10) | ◯ | Δ | ◯ | ◯ |
| Ex. 11 | (11) | (11) | ◯ | ◯ | ◯Δ | ◯Δ |
| Ex. 12 | (12) | (12) | ◯ | ◯ | ◯ | ◯ |
| Ex. 13 | (13) | (13) | ◯ | ◯ | ◯ | ◯ |
| Ex. 14 | (14) | (14) | ◯ | ◯ | ◯ | ◯ |
| Ex. 15 | (15) | (15) | ◯ | Δ | ◯ | ◯ |
| Ex. 16 | (16) | (16) | ◯ | ◯ | ◯ | ◯ |
| Ex. 18 | (18) | (18) | ◯ | ◯ | ◯ | ◯ |
| Ex. 19 | (19) | (19) | ◯ | ◯ | ◯ | ◯ |
| Ex. 20 | (20) | (20) | ◯ | ◯ | ◯Δ | ◯Δ |
| Com. Ex. 1 | (21) | (21) | Δ | X | Δ | Δ |

TABLE 2A-continued

|  | Positive electrode | Negative electrode | Initial resistance | Resistance increase | Rate characteristic | Cycle characteristic |
|---|---|---|---|---|---|---|
| Com. Ex. 2 | (22) | (22) | X | X | X | X |
| Com. Ex. 3 | (23) | (23) | X | X | X | X |
| Com. Ex. 4 | (24) | (24) | ○ | X | ○ | ○ |

TABLE 2B

|  | Positive electrode | Negative electrode | Initial resistance | Resistance increase | Rate characteristic | Cycle characteristic |
|---|---|---|---|---|---|---|
| Ex. 21 | (25) | (25) | ○ | ⊙ | ○ | ○ |
| Ex. 22 | (26) | (26) | ○ | ○ | ○ | ○ |
| Ex. 23 | (27) | (27) | ○ | ○ | ○ | ○ |
| Ex. 24 | (28) | (28) | ○ | Δ | ○ | ○ |
| Ex. 25 | (29) | (29) | ○ | Δ | ○ | ○ |
| Ex. 26 | (30) | (30) | ○ | Δ | ○ | ○ |
| Ex. 27 | (31) | (31) | ○ | ○ | ○ | ○ |
| Ex. 28 | (32) | (32) | ○ | ○ | ○ | ○ |
| Ex. 29 | (33) | (33) | ○ | Δ | ○ | ○ |
| Ex. 30 | (34) | (34) | ○ | ○ | ○ | ○ |
| Ex. 31 | (35) | (35) | ○ | ○ | ○ | ○ |
| Ex. 32 | (36) | (36) | ○ | ○ | ○ | ○ |
| Ex. 33 | (37) | (37) | ○ | ○ | ○ | ○ |
| Ex. 34 | (38) | (38) | ○ | ○ | ○ | ○ |
| Ex. 35 | (39) | (39) | ○ | Δ | ○ | ○ |
| Ex. 36 | (40) | (40) | ○ | Δ | ○Δ | ○Δ |
| Ex. 37 | (41) | (41) | ○ | ○ | ○ | ○ |
| Ex. 38 | (42) | (42) | ○ | ⊙ | ○ | ○ |
| Ex. 39 | (43) | (43) | ○ | ⊙ | ○ | ○ |
| Ex. 40 | (44) | (44) | ○ | ○ | ○ | ○ |
| Ex. 41 | (45) | (45) | ○ | ○ | ○ | ○ |
| Ex. 42 | (46) | (46) | ○ | ○ | ○ | ○ |
| Ex. 43 | (47) | (47) | ○ | ○ | ○ | ○ |
| Ex. 44 | (48) | (48) | ○ | ○ | ○ | ○ |
| Ex. 45 | (49) | (49) | ○ | Δ | ○ | ○ |
| Ex. 46 | (50) | (50) | ○ | Δ | ○ | ○ |
| Ex. 47 | (51) | (51) | ○ | ○ | ○Δ | ○Δ |

TABLE 2C

|  | Positive electrode | Negative electrode | Initial resistance | Resistance increase | Rate characteristic | Cycle characteristic |
|---|---|---|---|---|---|---|
| Ex. 48 | (52) | (52) | ○ | ○ | ○ | ○ |
| Ex. 49 | (53) | (53) | ○ | ○ | ○ | ○ |
| Ex. 50 | (54) | (54) | ○ | Δ | ○Δ | ○Δ |

As indicated in Tables 2A to 2C, it has been confirmed that by using the base layer formed from the conductive composition of the present invention, the internal resistance of a battery increases when the internal temperature of the battery rises. From this fact, it is considered that when the battery abnormally generates heat due to internal short circuit or the like, resistance of the current collector increases, a current is cut off, and ignition or the like of the battery is thereby avoided.

Meanwhile, in Comparative Example 1 in which no base layer was formed, Comparative Example 2 in which a base layer formed of water-dispersible resin fine particles (C) other than the present invention was formed, and Comparative Examples 3 and 4 in which a base layer formed of a resin other than the water-dispersible resin fine particles (C) in the present invention was formed, even when the internal temperature of a battery rose, a noticeable increase in internal resistance of the battery was not observed.

Reasons of these facts are considered to be the following. That is, in Comparative Example 1, no base layer was formed, and therefore there was no effect of increasing resistance at the time of heat generation. In Comparative Examples 2 and 4, volume expansion of the resin at the time of heat generation was insufficient, and therefore the conductive carbon materials dispersed in the conductive layer could not be cut. Furthermore, in Comparative Example 3, contact between the conductive carbon materials could not be cut locally because of nonuniform dispersibility of the polyolefin resin in the base layer. In addition, conductivity of the base layer was deteriorated because of nonuniform dispersibility of the conductive carbon material and the polyolefin resin and the rate characteristic and cycle characteristic were deteriorated.

As indicated in Examples 48 to 50, even when components other than the conductive carbon material (A), the water-soluble resin (B), and the water-dispersible resin fine particles (C) were added, certain effects such as the rate characteristics and an increase in resistance due to heating were confirmed. However, in order to efficiently obtain the intended effects, the above components are preferably contained in certain amounts.

<Mixture Ink for Positive Electrode and Negative Electrode for Electric Double Layer Capacitor>

85 parts of activated carbon (specific surface area 1800 $m^2/g$) as an active material, 5 parts of a conductive aid (acetylene black: Denka Black HS-100, Denki Kagaku Kogyo KK), 8 parts of carboxymethyl cellulose (Wako Pure Chemical Industries, Ltd.), 3.3 parts (2 parts as a solid content) of a binder (polytetrafluoroethylene 30-J: manufactured by Du Pont-Mitsui Fluorochemicals Company, Ltd., 60% aqueous dispersion), and 220 parts of water were mixed to manufacture a mixture ink for a positive electrode and a negative electrode.

Positive Electrode and Negative Electrode without Base Layer for Electric Double Layer Capacitor (Comparative Example 5 and Counter Electrodes for Evaluation)

The above mixture ink for an electric double layer capacitor was applied onto an aluminum foil having a thickness of 20 μm as a current collector using a doctor blade, and then was heated and dried. Thereafter, the resulting product was subjected to a rolling treatment by roll pressing to manufacture a positive electrode and a negative electrode each having an electrode thickness of 50 μm.

<Positive Electrode and Negative Electrode with Base Layer for Electric Double Layer Capacitor>

Example 51

The above mixture ink for an electric double layer capacitor was applied onto current collector (1) with a base layer in Example 1 using a doctor blade, and then was heated and dried at 80° C. Thereafter, the resulting product was subjected to a rolling treatment by roll pressing to manufacture a positive electrode having a thickness of 50 μm.

Examples 52 to 65 and Comparative Examples 5 to 8

A positive electrode and a negative electrode were obtained in a similar manner to Example 51 except that the current collector indicated in Table 3 was used.

<Electric Double Layer Capacitor>

Each of the positive electrode and the negative electrode indicated in Table 3 was punched into a diameter of 16 mm.

An electric double layer capacitor formed of the positive electrode, the negative electrode, a separator (porous polypropylene film) to be inserted therebetween, and an electrolytic solution (nonaqueous electrolytic solution prepared by dissolving TEMABF$_4$ (triethylmethylammonium tetrafluoroborate) at a concentration of 1 M in a propylene carbonate solvent) was manufactured. The electric double layer capacitor was performed in a glove box replaced with argon gas, and predetermined electric characteristics were evaluated after the electric double layer capacitor was manufactured.

(Resistance Measurement)

The laminate type battery which had been charged at a charge current of 10 C rate until the voltage reached a discharge end voltage of 2.0 V was subjected to resistance measurement at 500 kHz with an impedance analyzer (SP-50 manufactured by Biologic Corporation).

The above laminate type battery was heated from 25° C. to 180° C. and resistance measurement was performed at each temperature. Resistance measured at 25° C. was taken as initial resistance. A quotient between a resistance value measured at 180° C. and the resistance value measured at 25° C. was taken as resistance increase. That is, the resistance increase is expressed by the following (Formula 1).

Resistance increase=resistance value at 180° C./resistance value at 25° C.   (Formula 1)

The results of evaluating the initial resistance and the resistance increase according to the following criteria are indicated in Table 3.

Initial Resistance

◯: "Initial resistance is smaller than initial resistance of Comparative Example 1 without base layer. Excellent"

Δ: "Initial resistance is equivalent to initial resistance of Comparative Example 1 without base layer."

X: "Initial resistance is larger than initial resistance of Comparative Example 1 without base layer. Poor."

Resistance Increase

◯: "Resistance increase is five times or more initial resistance. Excellent"

Δ: "Resistance increase is three times or more and less than five times initial low performance. Effect of cutting off current is insufficient."

X: "Resistance increase is less than three times initial resistance. Effect of cutting off current is low. Poor."

(Charge and Discharge Cycle Characteristic)

The obtained electric double layer capacitor was subjected to charge and discharge measurement using a charge and discharge apparatus.

Charging was performed at a charge current of 10 C rate until the voltage reached a discharge end voltage of 2.0 V, and then constant current discharging was performed at a discharge current of 10 C rate until the voltage reached a discharge end voltage of 0 V. These charge and discharge cycles were taken as one cycle. Five cycles of charge and discharge were repeated, and a discharge capacity at the fifth cycle was taken as an initial discharge capacity. (An initial discharge capacity retention ratio is assumed to be 100%). As for a charge and discharge current rate, the magnitude of a current that can discharge a cell capacity in one hour was taken as 1 C.

Subsequently, charging was performed at a charge current of 10 C rate at a discharge end voltage of 2.0 V in a 50° C. thermostatic chamber, and then constant current discharging was performed at a discharge current of 10 C rate until the voltage reached a discharge end voltage of 0 V. This charge and discharge cycle was repeated 500 times, and a change ratio of the discharge capacity retention ratio (a value closer to 100% is better) was calculated.

◯: "Change ratio is 95% or more. Particularly excellent."

◯Δ: "Change ratio is 90% or more and less than 85%. No problem at all."

Δ: "Change ratio is 85% or more and less than 80%. There is a problem but at a usable level."

X: "Change ratio is less than 85%. There is a problem in practical use, and not usable."

TABLE 3

|  | Positive electrode (Current collector with base layer) | Negative electrode (Current collector with base layer) | Initial resistance | Resistance increase | Cycle characteristic |
|---|---|---|---|---|---|
| Ex. 51 | (1) | — | ◯ | ◯ | ◯ |
| Ex. 52 | (2) | — | ◯ | ◯ | ◯ |
| Ex. 53 | (5) | — | ◯ | ◯ | ◯Δ |
| Ex. 54 | (6) | — | ◯ | ◯ | ◯ |
| Ex. 55 | (14) | — | ◯ | ◯ | ◯ |
| Ex. 56 | (25) | — | ◯ | ◯ | ◯ |
| Ex. 57 | (30) | — | ◯ | Δ | ◯ |
| Ex. 58 | (46) | — | ◯ | ◯ | ◯ |
| Ex. 59 | (47) | — | ◯ | ◯ | ◯ |
| Ex. 60 | (48) | — | ◯ | ◯ | ◯ |
| Ex. 61 | (51) | — | ◯ | ◯ | ◯Δ |
| Ex. 62 | (52) | — | ◯ | ◯ | ◯ |
| Ex. 63 | (53) | — | ◯ | ◯ | ◯ |
| Ex. 64 | (54) | — | ◯ | ◯ | ◯Δ |
| Ex. 65 | — | (1) | ◯ | ◯ | ◯ |
| Com. Ex. 5 | — | — | Δ | x | Δ |
| Com. Ex. 6 | (22) | — | ◯ | x | ◯ |
| Com. Ex. 7 | (23) | — | x | x | ◯ |
| Com. Ex. 8 | (24) | — | ◯ | x | ◯ |

<Mixture Ink for Positive Electrode for Lithium Ion Capacitor>

85 parts of activated carbon (specific surface area 1800 m$^2$/g) as an active material, 5 parts of a conductive aid (acetylene black: Denka Black HS-100, Denki Kagaku Kogyo KK), 8 parts of carboxymethyl cellulose (Wako Pure Chemical Industries, Ltd.), and 3.3 parts (2 parts as a solid content) of a binder (polytetrafluoroethylene 30-J: manufactured by Du Pont-Mitsui Fluorochemicals Company, Ltd., 60% aqueous dispersion) were mixed to manufacture a mixture ink for a positive electrode.

<Mixture Ink for Negative Electrode for Lithium Ion Capacitor>

90 parts of graphite as a negative electrode active material, 5 parts of a conductive aid (acetylene black: Denka Black HS-100, Denki Kagaku Kogyo KK), and 175 parts (3.5 parts as a solid content) of a 2% by weight hydroxyethyl cellulose (Wako Pure Chemical Industries, Ltd.) aqueous solution were put in a mixer to be mixed, and 26.3 parts of water and 3.75 parts (1.5 parts as a solid content) of a binder (SBR: styrene butadiene latex, 40% aqueous dispersion) were mixed to manufacture a mixture ink for a negative electrode.

Positive Electrode without Base Layer for Lithium Ion Capacitor (Example 80 and Comparative Example 9)

The above mixture ink for a positive electrode for a lithium ion capacitor was applied onto an aluminum foil having a thickness of 20 μm as a current collector using a doctor blade, and then was heated and dried under reduced pressure. The resulting product was subjected to a rolling treatment by roll pressing, and then a positive electrode having a thickness of 60 μm was manufactured.

<Positive Electrode with Base Layer for Lithium Ion Capacitor> (Example 66)

The above mixture ink for a positive electrode for a lithium ion capacitor was applied onto current collector (1) with a base layer in Example 1 using a doctor blade, and then was heated and dried under reduced pressure. The resulting product was subjected to a rolling treatment by roll pressing, and then a positive electrode having a thickness of 60 μm was manufactured.

Examples 67 to 79 and Comparative Examples 10 to 12

A positive electrode was obtained in a similar manner to Example 66 except that the current collector indicated in Table 4 was used.

<Negative Electrode without Base Layer for Lithium Ion Capacitor (Examples 66 to 79 and Comparative Examples 9 to 12)

The above mixture ink for a negative electrode for a lithium ion capacitor was applied on a copper foil having a thickness of 20 μm as a current collector using a doctor blade, and then was heated and dried under reduced pressure. The resulting product was subjected to a rolling treatment by roll pressing, and then a negative electrode having a thickness of 45 μm was manufactured.

<Negative Electrode with Base Layer for Lithium Ion Capacitor> (Example 80)

The above mixture ink for a negative electrode for a lithium ion capacitor was applied onto current collector (1) with a base layer in Example 1 using a doctor blade, and then was heated and dried under reduced pressure. The resulting product was subjected to a rolling treatment by roll pressing, and then a negative electrode having a thickness of 45 μm was manufactured.

<Lithium Ion Capacitor>

The positive electrode indicated in Table 4 and a negative electrode which had been half-doped with lithium ions in advance were prepared in a size of 16 mm each. A lithium ion capacitor formed of the positive electrode, the negative electrode, a separator (porous polypropylene film) to be inserted therebetween, and an electrolytic solution (non-aqueous electrolytic solution prepared by dissolving $LiPF_6$ at a concentration of 1 M in a mixed solvent obtained by mixing ethylene carbonate, dimethyl carbonate, and diethyl carbonate at a ratio of 1:1:1 (volume ratio)) was manufactured. Half doping with lithium ions was performed by sandwiching the separator between the negative electrode and a lithium metal in a beaker cell and doping the negative electrode with lithium ions such that the doping amount was about half of a negative electrode capacity. In addition, the lithium ion capacitor was performed in a glove box replaced with argon gas, and predetermined electric characteristics were evaluated after the lithium ion capacitor was manufactured.

(Resistance Measurement)

A laminate type battery which had been charged at a charge current of 10 C rate until the voltage reached a discharge end voltage of 4.0 V was subjected to resistance measurement at 500 kHz with an impedance analyzer (SP-50 manufactured by Biologic Corporation).

The above laminate type battery was heated from 25° C. to 180° C. and resistance measurement was performed at each temperature. Resistance measured at 25° C. was taken as initial resistance. A quotient between a resistance value measured at 180° C. and the resistance value measured at 25° C. was taken as resistance increase. That is, the resistance increase is expressed by the following (Formula 1).

Resistance increase=resistance value at 180° C./resistance value at 25° C. (Formula 1)

The results of evaluating the initial resistance and the resistance increase according to the following criteria are indicated in Table 4.

Initial Resistance

◯: "Initial resistance is smaller than initial resistance of Comparative Example 1 without base layer. Excellent"

Δ: "Initial resistance is equivalent to initial resistance of Comparative Example 1 without base layer."

X: "Initial resistance is larger than initial resistance of Comparative Example 1 without base layer. Poor."

Resistance Increase

◯: "Resistance increase is five times or more initial resistance. Excellent"

Δ: "Resistance increase is three times or more and less than five times initial low performance. Effect of cutting off current is insufficient."

X: "Resistance increase is less than three times initial resistance. Effect of cutting off current is low. Poor."

(Charge and Discharge Cycle Characteristic)

The obtained lithium ion capacitor was subjected to charge and discharge measurement using a charge and discharge apparatus.

Charging was performed at a charge current of 10 C rate until the voltage reached a discharge end voltage of 4.0 V, and then constant current discharging was performed at a discharge current of 10 C rate until the voltage reached a discharge end voltage of 2.0 V. These charge and discharge cycles were taken as one cycle. Five cycles of charge and discharge were repeated, and a discharge capacity at the fifth cycle was taken as an initial discharge capacity. (An initial discharge capacity retention ratio is assumed to be 100%).

Subsequently, charging was performed at a charge current of 10 C rate at a discharge end voltage of 4.0 V in a 50° C. thermostatic chamber, and then constant current discharging was performed at a discharge current of 10 C rate until the voltage reached a discharge end voltage of 2.0 V. This charge and discharge cycle was repeated 500 times, and a change ratio of the discharge capacity retention ratio (a value closer to 100% is better) was calculated.

◯: "Change ratio is 95% or more. Particularly excellent."

◯Δ: "Change ratio is 90% or more and less than 95%. No problem at all."

Δ: "Change ratio is 85% or more and less than 90%. There is a problem but at a usable level."

X: "Change ratio is less than 85%. There is a problem in practical use, and not usable."

TABLE 4

| | Positive electrode (Current collector with base layer) | Negative electrode (Current collector with base layer) | Initial resistance | Resistance increase | Cycle characteristic |
|---|---|---|---|---|---|
| Ex. 66 | (1) | — | ◯ | ◯ | ◯ |
| Ex. 67 | (2) | — | ◯ | ◯ | ◯ |
| Ex. 68 | (5) | — | ◯ | ◯ | ◯Δ |
| Ex. 69 | (6) | — | ◯ | ◯ | ◯ |
| Ex. 70 | (14) | — | ◯ | ◯ | ◯ |
| Ex. 71 | (25) | — | ◯ | ◯ | ◯ |
| Ex. 72 | (30) | — | ◯ | Δ | ◯ |
| Ex. 73 | (46) | — | ◯ | ◯ | ◯ |
| Ex. 74 | (47) | — | ◯ | ◯ | ◯ |
| Ex. 75 | (48) | — | ◯ | ◯ | ◯ |
| Ex. 76 | (51) | — | ◯ | ◯ | ◯Δ |
| Ex. 77 | (52) | — | ◯ | ◯ | ◯ |
| Ex. 78 | (53) | — | ◯ | | ◯ |
| Ex. 79 | (54) | — | | ◯ | ◯Δ |
| Ex. 80 | — | (1) | ◯ | ◯ | ◯ |
| Com. Ex. 9 | — | — | Δ | x | Δ |
| Com. Ex. 10 | (22) | — | ◯ | x | ◯ |
| Com. Ex. 11 | (23) | — | x | x | ◯ |
| Com. Ex. 12 | (24) | — | ◯ | x | ◯ |

In addition, as indicated in Tables 3 and 4, it has been able to be confirmed that a similar effect to Examples of the lithium ion secondary battery can be obtained also in the electric double layer capacitor or the lithium ion capacitor.

Example 81

<Conductive Composition>

Deionized water was added to calcium nitrate tetrahydrate (E-1:$Ca(NO_3)_2 \cdot 4H_2O$) as a water-soluble polyvalent metal compound, and calcium nitrate tetrahydrate (E-1: $Ca(NO_3)_2 \cdot 4H_2O$) was dissolved therein to adjust a 10% by mass aqueous solution in terms of calcium (Ca).

To 240 parts by mass of water-dispersible olefin resin fine particles (C-1: Arrow base SB-1200, manufactured by Unitika Ltd., 25% aqueous dispersion (volume average particle diameter (CV1) 0.16 μm, modification amount (Y)/(X) 0.58, polyethylene), 960 parts by mass of deionized water was added. Thereafter, 3.6 parts by mass of the above 10% by mass calcium aqueous solution was added under stirring with a disper to obtain water-dispersible aggregated fine particles. The volume average particle diameter (CV2) of the water-dispersible aggregated fine particles was 0.53 μm. The water-dispersible aggregated fine particles thus obtained were heated under reduced pressure using a rotary evaporator and was concentrated to 25% by mass.

40 parts by mass of acetylene black (A-1: Denka Black HS-100, manufactured by Denki Kagaku Kogyo KK) as a conductive carbon material, 1000 parts by mass of deionized water as the aqueous liquid medium (D), and 0.4 parts by mass of an ether type nonionic surfactant (Triton X, manufactured by Roche Life Science Co., Ltd.) were put in a mixer to be mixed, and were further dispersed in a sand mill.

Subsequently, 240 parts by mass of the above water-dispersible aggregated fine particles concentrated to 25% by mass was added and was mixed with a mixer to obtain conductive composition (55).

Example 82

Deionized water was added to calcium nitrate tetrahydrate (E-1:$Ca(NO_3)_2 \cdot 4H_2O$) as a water-soluble polyvalent metal compound, and calcium nitrate tetrahydrate (E-1: $Ca(NO_3)_2 \cdot 4H_2O$) was dissolved therein to adjust a 10% by mass aqueous solution in terms of calcium (Ca).

To 200 parts by mass of water-dispersible olefin resin fine particles (C-1: Arrow base SB-1200, manufactured by Unitika Ltd., 25% aqueous dispersion (volume average particle diameter (CV1) 0.16 μm, modification amount (Y)/(X) 0.58, polyethylene), 800 parts by mass of deionized water was added. Thereafter, 3 parts by mass of the above 10% by mass calcium aqueous solution was added under stirring with a disper to obtain water-dispersible aggregated fine particles. The volume average particle diameter (CV2) of the water-dispersible aggregated fine particles was 0.53 μm. The water-dispersible aggregated fine particles thus obtained were heated under reduced pressure using a rotary evaporator and was concentrated to 25% by mass.

25 parts by mass of acetylene black (A-1: Denka Black HS-100, manufactured by Denki Kagaku Kogyo KK) as a conductive carbon material and 1000 parts by mass (25 parts by mass as a solid content) of a 2.5% aqueous solution of carboxymethyl cellulose (B-1: CMC Daicel #1240, manufactured by Daicel Corporation) as a water-soluble resin were put in a mixer to be mixed, and were further dispersed in a sand mill.

Subsequently, 200 parts by mass of the above water-dispersible aggregated fine particles concentrated to 25% by mass was added and was mixed with a mixer to obtain conductive composition (56).

Examples 83 to 99

Conductive compositions (57) to (73) in Examples were obtained in a similar manner to the conductive composition (56) except that the composition ratios were changed to those indicated in Tables 5A and 5B.

Example 100

25 parts by mass of acetylene black (A-1: Denka Black HS-100, manufactured by Denki Kagaku Kogyo KK) as a conductive carbon material and 1000 parts by mass (25 parts by mass as a solid content) of a 2.5% aqueous solution of carboxymethyl cellulose (B-1: CMC Daicel #1240, manufactured by Daicel Corporation) as a water-soluble resin were put in a mixer to be mixed, and were further dispersed in a sand mill to obtain a slurry.

To the above slurry, 3 parts by mass of the 10% by mass calcium aqueous solution described in Example 81 was added under stirring with a disper. Thereafter, 200 parts by mass of water-dispersible olefin resin fine particles (C-1: Arrow base SB-1200, manufactured by Unitika Ltd., 25% aqueous dispersion (volume average particle diameter (CV1) 0.16 μm, modification amount (Y)/(X) 0.58, polyethylene) was added thereto, and was mixed with a mixer to obtain conductive composition (74).

Example 101

25 parts by mass of acetylene black (A-1: Denka Black HS-100, manufactured by Denki Kagaku Kogyo KK) as a conductive carbon, material, 1000 parts by mass (25 parts by mass as a solid content) of a 2.5% aqueous solution of carboxymethyl cellulose (B-1: CMC Daicel #1240, manufactured by Daicel Corporation) as a water-soluble resin, and 3 parts by mass of the 10% by mass calcium aqueous solution described in Example 81 were put in a mixer to be mixed, and were further dispersed in a sand mill to obtain a slurry.

Subsequently, 200 parts by mass of water-dispersible olefin resin fine particles (C-1: Arrow base SB-1200, manufactured by Unitika Ltd., 25% aqueous dispersion (volume average particle diameter (CV1) 0.16 μm, modification amount (Y)/(X) 0.58, polyethylene) was added to the above slurry, and was mixed with a mixer to obtain conductive composition (75).

Comparative Example 14

Conductive composition (77) was obtained with the composition indicated in Tables 5A and 5B in a similar manner to Example 81 except that no polyvalent metal compound was added.

Comparative Example 15

Conductive composition (78) was obtained with the composition indicated in Tables 5A and 5B in a similar manner to Example 81 except that a 10% by mass sodium hydroxide aqueous solution was added in place of the polyvalent metal compound, and the addition was performed such that the addition amount of a sodium ion was 0.36 parts by mass, and a mass ratio between a mass (Na') of the sodium ion and a mass (C') of a solid content of the water-dispersible olefin resin fine particles (C) satisfied (Na')/(C')=0.006. As indicated in Tables 5A and 5B, water-dispersible aggregated particles could not be obtained by changing the polyvalent metal compound to a monovalent metal compound.

Comparative Example 16

Deionized water was added to calcium nitrate tetrahydrate (E-1:$Ca(NO_3)_2.4H_2O$) as a water-soluble polyvalent metal compound, and calcium nitrate tetrahydrate (E-1: $Ca(NO_3)_2.4H_2O$) was dissolved therein to adjust a 10% by mass aqueous solution in terms of calcium (Ca).

70 parts by mass of acetylene black (A-1: Denka Black HS-100, manufactured by Denki Kagaku Kogyo KK) as a conductive carbon material and 1200 parts by mass (30 parts by mass as a solid content) of a 2.5% aqueous solution of carboxymethyl cellulose (B-1: CMC Daicel #1240, manufactured by Daicel Corporation) as a water-soluble resin were put in a mixer to be mixed, and were further dispersed in a sand mill.

Subsequently, 3 parts by mass of the 10% by mass calcium aqueous solution was added thereto and was mixed with a mixer to obtain conductive composition (79).

Comparative Example 17

To 167 parts by mass of water-dispersible olefin resin fine particles (C-6: Zeiksen AC (solid content 30% aqueous dispersion, volume average particle diameter (CV1) 0.10 μm), 333 parts by mass of deionized water was added. Thereafter, 500 parts by mass of the 10% by mass calcium aqueous solution described in Example 81 was added under stirring with a disper. In the resulting water-dispersible aggregated fine particles, resin fine particles were aggregated, and conductive composition (80) was manufactured in a similar manner to Example 90, but evaluation after that could not be performed.

<Current Collector with Base Layer> (Examples 81 to 101 and Comparative Examples 14 to 16)

Conductive compositions (55) to (75) and (77) to (79) were each applied onto an aluminum foil having a thickness of 20 μm as a current collector using a bar coater, and then was heated and dried at 80° C. to obtain current collectors with a base layer for a nonaqueous electrolyte secondary battery (55) to (75) and (77) to (79) so as to have a thickness of 2 μm, respectively. Note that the current collector in Comparative Example 13 was formed only of an aluminum foil having no base layer.

TABLE 5A

| | | | conductive composition | | | | | | |
|---|---|---|---|---|---|---|---|---|---|
| | | | Conductive carbon material (A) | | Water soluble resin (B) | | Water-dispersible olefin resin fine particles (C) | Volume particle diameter | Volume particle diameter |
| Ex. | | | | Addition amount | | Addition amount | | Addition amount | (CV1) (μm) | (CV2) (μm) |
| 81 | (55) | A-1 | | 40 | — | — | C-1 | 60 | 0.16 | 0.53 |
| 82 | (56) | A-1 | | 25 | B-1 | 25 | C-1 | 50 | 0.16 | 0.53 |

TABLE 5A-continued

| | | | | | | | | | |
|---|---|---|---|---|---|---|---|---|---|
| 83 | (57) | A-1 | 25 | B-1 | 25 | C-1 | 50 | 0.16 | 0.45 |
| 84 | (58) | A-1 | 25 | B-1 | 25 | C-1 | 50 | 0.16 | 0.35 |
| 85 | (59) | A-1 | 25 | B-1 | 25 | C-1 | 50 | 0.16 | 0.38 |
| 86 | (60) | A-1 | 25 | B-1 | 25 | C-1 | 50 | 0.16 | 0.50 |
| 87 | (61) | A-1 | 25 | B-1 | 25 | C-1 | 50 | 0.16 | 0.61 |
| 88 | (62) | A-1 | 25 | B-1 | 25 | C-1 | 50 | 0.16 | 0.24 |
| 89 | (63) | A-1 | 25 | B-1 | 25 | C-2 | 50 | 0.26 | 0.83 |
| 90 | (64) | A-1 | 25 | B-1 | 25 | C-6 | 50 | 0.10 | 0.32 |
| 91 | (65) | A-1 | 25 | B-1 | 25 | C-6 | 50 | 0.10 | 0.19 |
| 92 | (66) | A-1 | 25 | B-1 | 25 | C-6 | 50 | 0.10 | 0.75 |
| 93 | (67) | A-1 | 25 | B-1 | 25 | C-11 | 50 | 0.57 | 1.81 |
| 94 | (68) | A-2 | 15 | B-1 | 25 | C-1 | 50 | 0.16 | 0.53 |
| 95 | (69) | A-2 | 15 | B-1 | 45 | C-1 | 40 | 0.16 | 0.53 |
| 96 | (70) | A-1 | 45 | B-1 | 15 | C-1 | 40 | 0.16 | 0.53 |
| 97 | (71) | A-1 | 25 | B-1 | 15 | C-1 | 60 | 0.16 | 0.53 |
| 98 | (72) | A-1 | 25 | B-9 | 25 | C-1 | 50 | 0.16 | 0.53 |
| 99 | (73) | A-1 | 25 | B-3 | 25 | C-1 | 50 | 0.16 | 0.53 |
| 100 | (74) | A-1 | 25 | B-1 | 25 | C-1 | 50 | 0.16 | — |
| 101 | (75) | A-1 | 25 | B-1 | 25 | C-1 | 50 | 0.16 | — |

| | conductive composition | | | Current collector with base layer | | |
|---|---|---|---|---|---|---|
| | Water-dispersible olefin resin fine particles (C) | Polyvalent metal compound (E) | | | | Base layer |
| Ex. | CV2/CV1 | | Addition amount | Mass ratio E'/C' | Current collector | thickness (μm) |
| 81 | 3.3 | E-1 | 0.36 | 0.006 | (55) Al | 2 |
| 82 | 3.3 | E-1 | 0.30 | 0.006 | (56) Al | 2 |
| 83 | 2.8 | E-2 | 0.18 | 0.004 | (57) Al | 2 |
| 84 | 2.2 | E-3 | 0.26 | 0.005 | (58) Al | 2 |
| 85 | 2.4 | E-4 | 0.37 | 0.007 | (59) Al | 2 |
| 86 | 3.1 | E-5 | 0.49 | 0.010 | (60) Al | 2 |
| 87 | 3.8 | E-6 | 0.33 | 0.007 | (61) Al | 2 |
| 88 | 1.5 | E-7 | 0.99 | 0.020 | (62) Al | 2 |
| 89 | 3.2 | E-1 | 0.30 | 0.006 | (63) Al | 2 |
| 90 | 3.2 | E-1 | 0.30 | 0.006 | (64) Al | 2 |
| 91 | 1.2 | E-1 | 0.10 | 0.002 | (65) Al | 2 |
| 92 | 4.7 | E-1 | 0.40 | 0.008 | (66) Al | 2 |
| 93 | 3.2 | E-1 | 0.30 | 0.006 | (67) Al | 2 |
| 94 | 3.3 | E-1 | 0.30 | 0.006 | (68) Al | 2 |
| 95 | 3.3 | E-1 | 0.24 | 0.006 | (69) Al | 2 |
| 96 | 3.3 | E-1 | 0.24 | 0.006 | (70) Al | 2 |
| 97 | 3.3 | E-1 | 0.36 | 0.006 | (71) Al | 2 |
| 98 | 3.3 | E-1 | 0.30 | 0.006 | (72) Al | 2 |
| 99 | 3.3 | E-1 | 0.30 | 0.006 | (73) Al | 5 |
| 100 | — | E-1 | 0.30 | 0.006 | (74) Al | 2 |
| 101 | — | E-1 | 0.30 | 0.006 | (75) Al | 2 |

TABLE 5B

| | conductive composition | | | | | | | |
|---|---|---|---|---|---|---|---|---|
| | | Conductive carbon material (A) | | Water soluble resin (B) | | Water-dispersible olefin resin fine particles (C) | Volume particle diameter (CV1) (μm) | Volume particle diameter (CV2) (μm) |
| Ex. | | | Addition amount | | Addition amount | Addition amount | | |
| Com. Ex. 13 | | — | — | — | | — | | |
| Com. Ex. 14 | (77) | A-1 | 40 | — | | C-1 60 | 0.16 | — |
| Com. Ex. 15 | (78) | A-1 | 40 | — | | C-1 60 | 0.16 | 0.16 |
| Com. Ex. 16 | (79) | A-1 | 70 | B-1 | 30 | — | | |

TABLE 5B-continued

| | conductive composition | | | Current collector with base layer | | |
|---|---|---|---|---|---|---|
| | Water-dispersible olefin resin fine particles (C) CV2/CV1 | Polyvalent metal compound (E) | | | | Base layer thickness (μm) |
| Ex. | | Addition amount | Mass ratio E'/C' | | Current collector | |
| Com. Ex. 13 | — | — | — | | — Al | — |
| Com. Ex. 14 | — | — | — | (77) | Al | 2 |
| Com. Ex. 15 | 1.0 | — | — | (78) | Al | 2 |
| Com. Ex. 16 | — | E-1 | 0.30 | (79) | Al | 2 |

Incidentally, in Tables 5A and 5B, the addition amount of the carbon material A is in terms of parts by mass, and the addition amounts of the water-soluble resin B and the fine particles C are in terms of parts by mass of a solid content. "Volume particle diameter (CV1)" represents a volume average particle diameter (μm) of the water-dispersible olefin resin fine particles C and "volume particle diameter (CV2)" represents a volume average particle diameter (μm) of the water-dispersible aggregated fine particles. "Al" represents an aluminum foil.

In Tables 5A and 5B, the solid content of the addition amount of the water-dispersible olefin resin fine particles (C) represents a solid content mass (C') of the water-dispersible olefin resin fine particles (C), the addition of the polyvalent metal compound (E) represents a mass (E') of a metal ion in the water-soluble polyvalent metal compound (E), and a mass ratio E'/C' in Tables represents a ratio therebetween.

Comparative Example 3

Addition was performed such that the addition amount of a sodium ion was 0.3 parts by mass, and a mass ratio between a mass (Na') of the sodium ion and a mass (C') of the solid content of the water-dispersible olefin resin fine particles (C) satisfied (Na')/(C')=0.006.

<Mixture Ink for Lithium Ion Secondary Battery Positive Electrode>

93 parts by mass of $LiNi_{0.5}Mn_{0.3}Co_{0.2}O_2$ as a positive electrode active material, 4 parts by mass of acetylene black as a conductive agent, 3 parts by mass of polyvinylidene fluoride as a binder, and 45 parts by mass of N-methyl pyrrolidone were put and mixed to manufacture a mixture ink for a positive electrode.

<Mixture Ink for Lithium Ion Secondary Battery Negative Electrode>

98 parts by mass of artificial graphite as a negative electrode active material and 66.7 parts by mass (1 part by mass as a solid content) of a 1.5% carboxymethyl cellulose aqueous solution were put in a planetary mixer and kneaded, and 33 parts by mass of water and 2.08 parts by mass (1 part by mass as a solid content) of a 48% by mass aqueous styrene butadiene emulsion dispersion were mixed to obtain a mixture ink for a negative electrode secondary battery electrode.

<Positive Electrode with Base Layer for Lithium Ion Secondary Battery> (Examples 81 to 101 and Comparative Examples 14 to 16)

The above mixture ink for a lithium ion secondary battery positive electrode was applied onto current collectors with a base layer for a nonaqueous electrolyte secondary battery (55) to (75) and (77) to (79) using a doctor blade, and then was heated and dried at 80° C. to perform adjustment such that a weight per unit area of an electrode was 20 mg/cm². A rolling treatment by roll pressing was further performed to manufacture positive electrodes (55) to (75) and (77) to (79) in which a mixture layer had a density of 3.1 g/cm³.

<Positive Electrode without Base Layer for Lithium Ion Secondary Battery> (Positive Electrode for Comparative Example 13)

The above mixture ink for a lithium ion secondary battery positive electrode was applied onto an aluminum foil having a thickness of 20 μm as a current collector using a doctor blade, and then was heated and dried at 80° C. to perform adjustment such that a weight per unit area of an electrode was 20 mg/cm². A rolling treatment by roll pressing was further performed to manufacture a positive electrode (76) in which a mixture layer had a density of 3.1 g/cm³.

<Negative Electrode for Lithium Ion Secondary Battery> (Negative Electrodes for Examples 81 to 101 and Comparative Examples 13 to 16)

The above mixture ink for a lithium ion secondary battery negative electrode was applied onto a copper foil having a thickness of 20 μm as a current collector using a doctor blade, and then was heated and dried at 80° C. to perform adjustment such that a weight per unit area of an electrode was 12 mg/cm². A rolling treatment by roll pressing was further performed to manufacture negative electrodes (55) to (79) in which a mixture layer had a density of 1.5 g/cm³.

<Laminate Type Lithium Ion Secondary Battery> (Examples 81 to 101) and Comparative Examples 13 to 16)

The positive electrode and the negative electrode indicated in Table 6 were punched into 45 mm×40 mm and 50 mm×45 mm, respectively. The positive electrode, the negative electrode, and a separator (porous polypropylene film) to be inserted therebetween were inserted into an aluminum laminate bag, and were vacuum-dried. Thereafter, an electrolytic solution (nonaqueous electrolytic solution prepared by dissolving $LiPF_6$ at a concentration of 1 M in a mixed solvent obtained by mixing ethylene carbonate and diethyl carbonate at a ratio of 1:1 (volume ratio)) was injected thereinto, and then the aluminum laminate was sealed to manufacture a laminate type lithium ion battery. The laminate type lithium ion battery was manufactured in a glove box replaced with argon gas. After the laminate type lithium ion battery was manufactured, battery characteristics of initial resistance, resistance increase, rate characteristic, and cycle characteristic described below were evaluated.

(Resistance Measurement)

A laminate type battery which had been discharged with a constant current at a discharge current of 12 mA (0.2 C) at a discharge end voltage of 3.0 V was subjected to resistance measurement at 500 kHz with an impedance analyzer (SP-50 manufactured by Biologic Corporation).

The above laminate type battery was heated from 25° C. to 180° C. and resistance measurement was performed at each temperature. Resistance measured at 25° C. was taken as initial resistance. A quotient between a resistance value measured at 180° C. and the resistance value measured at 25° C. was taken as resistance increase. That is, the resistance increase is expressed by the following (Formula 1).

Resistance increase=resistance value at 180° C./resistance value at 25° C.　　(Formula 1)

The results of evaluating the initial resistance and the resistance increase according to the following criteria are indicated in Table 6.

Initial Resistance

◯: "Initial resistance is smaller than initial resistance of Comparative Example 13 without base layer. Excellent"

Δ: "Initial resistance is equivalent to initial resistance of Comparative Example 13 without base layer."

X: "Initial resistance is larger than initial resistance of Comparative Example 13 without base layer. Poor."

Resistance Increase

⊙: "Resistance increase is 10 times or more initial resistance. Particularly excellent."

◯: "Resistance increase is five times or more and less than 10 times initial resistance. Excellent"

Δ: "Resistance increase is three times or more and less than five times initial resistance. The effect is not sufficient, but usable."

X: "Resistance increase is less than three times initial resistance. Effect of cutting off current is low. Poor."

(Rate Characteristic)

The above laminated battery was subjected to charge and discharge measurement using a charge and discharge apparatus (SM-8 manufactured by Hokuto Denko Co., Ltd.).

Constant current constant voltage charging (cut off current 0.6 mA was performed at a charge current of 12 mA (0.2 C) at a charge end voltage of 4.2 V, then constant current discharging was performed at a discharge current of 12 mA (0.2 C) or 120 mA (2 C) until the voltage reached a discharge end voltage of 3.0 V, and discharge capacity was determined. The rate characteristic is expressed by a ratio between the 0.2 C discharge capacity and the 2 C discharge capacity, that is, the following (Formula 2).

Rate characteristic=2 C discharge capacity/0.2 C discharge capacity×100(%)　　(Formula 2)

Results evaluated according to the following criteria are indicated in Table 6.

Rate Characteristics

◯: "Rate characteristic is 80% or more. Particularly excellent."

◯Δ: "Rate characteristic is 75% or more and less than 80%. Excellent"

Δ: "Rate characteristic is 70 or more and less than 75%. Equivalent to rate characteristic of Comparative Example 13 without base layer."

X: "Rate characteristic is less than 70%. Poor."

(Cycle Characteristic)

Constant current constant voltage charging (cut off current 0.6 mA) was performed at a charge current of 60 mA at a charge end voltage of 4.2 V in a 50° C. thermostatic chamber, then constant current discharging was performed at a discharge current of 60 mA until the voltage reached a discharge end voltage of 3.0 V, and initial discharge capacity was determined. This charge and discharge cycle was repeated 200 times, and a discharge capacity retention ratio (percentage of discharge capacity at the 200th time with respect to initial discharge capacity) was calculated. Results evaluated according to the following criteria are indicated in Table 6.

Cycle Characteristics

◯: "Discharge capacity retention ratio is 90% or more. Particularly excellent."

◯Δ: "Discharge capacity retention ratio is 85% or more and less than 90%. Excellent"

Δ: "Discharge capacity retention ratio is 80% or more and less than 85%. Equivalent to discharge capacity retention rate of Comparative Example 13 without base layer."

X: "Discharge capacity retention ratio is less than 80%. Poor."

TABLE 6

| | Positive electrode | Negative electrode | Initial resistance | Resistance increase | Rate characteristic | Cycle characteristic |
|---|---|---|---|---|---|---|
| Ex. 81 | (55) | (55) | ◯ | Δ | ◯ | ◯ |
| Ex. 82 | (56) | (56) | ◯ | ⊙ | ◯ | ◯ |
| Ex. 83 | (57) | (57) | ◯ | ⊙ | ◯ | ◯ |
| Ex. 84 | (58) | (58) | ◯ | ⊙ | ◯ | ◯ |
| Ex. 85 | (59) | (59) | ◯ | ⊙ | ◯ | ◯ |
| Ex. 86 | (60) | (60) | ◯ | ⊙ | ◯ | ◯ |
| Ex. 87 | (61) | (61) | ◯ | ⊙ | ◯ | ◯ |
| Ex. 88 | (62) | (62) | ◯ | ⊙ | ◯ | ◯ |
| Ex. 89 | (63) | (63) | ◯ | ⊙ | ◯ | ◯ |
| Ex. 90 | (64) | (64) | ◯ | ⊙ | ◯ | ◯ |
| Ex. 91 | (65) | (65) | ◯ | ⊙ | ◯ | ◯ |
| Ex. 92 | (66) | (66) | ◯ | ⊙ | ◯ | ◯ |
| Ex. 93 | (67) | (67) | ◯ | ◯ | ◯ | ◯ |
| Ex. 94 | (68) | (68) | ◯ | ⊙ | ◯ | ◯ |
| Ex. 95 | (69) | (69) | ◯ | ⊙ | ◯ | ◯ |
| Ex. 96 | (70) | (70) | ◯ | ⊙ | ◯ | ◯ |
| Ex. 97 | (71) | (71) | ◯ | ⊙ | ◯ | ◯ |
| Ex. 98 | (72) | (72) | ◯ | ⊙ | ◯ | ◯ |
| Ex. 99 | (73) | (73) | ◯ | ⊙ | ◯ | ◯ |
| Ex. 100 | (74) | (74) | ◯ | ⊙ | ◯ | ◯ |
| Ex. 101 | (75) | (75) | ◯ | ⊙ | ◯ | ◯ |
| Com. Ex. 13 | (76) | (76) | Δ | X | Δ | Δ |
| Com. Ex. 14 | (77) | (77) | ◯ | X | ◯ | ◯ |
| Com. Ex. 15 | (78) | (78) | ◯ | X | ◯ | ◯ |
| Com. Ex. 16 | (79) | (79) | ◯ | X | ◯ | ◯ |
| Com. Ex. 17 | — | — | — | — | — | — |

As indicated in Table 6, in Comparative Examples 14 and 15 in which no water-soluble polyvalent metal compound was contained, no noticeable increase in resistance was confirmed when the internal temperature of a battery rose. However, as described in Examples of the present invention, an effect of increasing the internal resistance of a battery was confirmed by adding a polyvalent metal ion.

Meanwhile, in Comparative Example 13 in which no base layer was formed and Comparative Example 16 containing no water-dispersible olefin resin fine particles, no noticeable increase in resistance was observed even when the internal temperature of a battery rose. It is considered that Comparative Example 13 had no effect of increasing resistance at the time of heat generation due to forming no base layer, and Comparative Example 16 had no effect of cutting carbons because volume expansion due to heat did not occur because of containing no water-dispersible olefin resin fine particles.

In Comparative Example 17, a polyvalent metal ion was added in an excessive amount, and therefore the resin fine particles were aggregated, and a conductive composition could not be manufactured.

From the above results, the present invention can provide a conductive composition for forming an electric storage device such as a nonaqueous electrolyte secondary battery, having excellent output characteristics or the like of a battery, and having a function of improving safety of the battery by suppressing a flowing current by raising the internal resistance when the internal temperature of the battery rises due to overcharge, internal short circuit, or the like.

The invention claimed is:

1. A conductive composition comprising: a conductive carbon material (A); a water-soluble resin (B); water-dispersible resin fine particles (C); and an aqueous liquid medium (D), wherein the water-dispersible resin fine particles contain at least olefin resin fine particles,
   wherein a content of the conductive carbon material (A) is 10 to 70% by mass, a content of the water-soluble resin (B) is 10 to 50% by mass, and a content of the water-dispersible resin fine particles (C) is 10 to 70% by mass in the total solid content of 100% by mass of the conductive composition, and
   wherein the olefin resin fine particles contained in the water-dispersible resin fine particles (C) are polyolefin resin particles modified with at least a carboxylic acid or a carboxylate ester, and a ratio (Y)/(X) between a maximum peak height (maximum absorbance) (X) at 2800 to 3000 $cm^{-1}$ and a maximum peak height (maximum absorbance) (Y) at 1690 to 1740 $cm^{-1}$ is 0.03 to 1.0 in an infrared absorption spectrum of the polyolefin resin particles.

2. The conductive composition according to claim 1, wherein a ratio of the olefin resin fine particles in resin fine particles contained in the water-dispersible resin fine particles (C) is 50 to 100% by mass.

3. The conductive composition according to claim 1, wherein the olefin resin fine particles contained in the water-dispersible resin fine particle (C) are formed of polyethylene modified with at least a carboxylic acid or a carboxylate ester, and the ratio (Y)/(X) is 0.1 to 0.8.

4. The conductive composition according to claim 1, wherein the olefin resin fine particles contained in the water-dispersible resin fine particles (C) are formed of polypropylene modified with at least a carboxylic acid or a carboxylate ester, and the ratio (Y)/(X) is 0.03 to 0.5.

5. The conductive composition according to claim 1, wherein a coating film coated with the conductive composition has a gloss value of 0.1 to 55.

6. The conductive composition according to claim 1, wherein the conductive carbon material (A) is carbon black in which secondary particles are formed by aggregation of primary particles, the primary particles have diameters of 1 to 100 nm, and a volume average particle diameter (D50) is 0.2 to 5 μm.

7. The conductive composition according to claim 6, wherein the volume average particle diameter of the carbon black is larger than the volume average particle diameter of the olefin resin fine particles contained in the water-dispersible resin particles (C).

8. The conductive composition according to claim 1, further comprising a water-soluble polyvalent metal compound (E), wherein a mass ratio (E')/(C') between a solid content mass (C') of the olefin resin fine particles in the water-dispersible resin fine particles (C) and a mass (E') of a metal ion in the polyvalent metal compound (E) is 0.001 to 0.1% by mass.

9. The conductive composition according to claim 1, comprising water-dispersible aggregated fine particles formed of the olefin resin fine particles in the water-dispersible resin fine particles (C) and a polyvalent metal compound (E).

10. The conductive composition according to claim 9, wherein a volume average particle diameter (CV1) of the olefin resin fine particles in the water-dispersible resin fine particles (C) is 0.05 to 1 μm, and a ratio (CV2)/(CV1) between the (CV1) and a volume average particle diameter (CV2) of the water-dispersible aggregated fine particles is 1.1 to 5.0.

11. The conductive composition according to claim 1, wherein the conductive composition is used for forming a base layer of an electrode for an electric storage device.

12. A current collector with a base layer for an electric storage device, comprising a current collector and a base layer formed from the conductive composition according to claim 11.

13. An electrode for an electric storage device, comprising a current collector, a base layer formed from the conductive composition according to claim 11, and a mixture layer formed from an electrode-forming composition containing an electrode active material and a binder.

14. An electric storage device comprising a positive electrode, a negative electrode, and an electrolytic solution, wherein at least one of the positive electrode and the negative electrode is the electrode for an electric storage device according to claim 13.

15. The electric storage device according to claim 14, wherein the electric storage device is any one of a nonaqueous electrolyte secondary battery, an electric double layer capacitor, and a lithium ion capacitor.

16. A method for manufacturing the conductive composition according to claim 8, by adding the water-dispersible resin fine particles (C) to a slurry in which the conductive carbon material (A), the water-soluble resin (B), the aqueous liquid medium (D), and the water-soluble polyvalent metal compound (E) are dispersed.

17. A method for manufacturing the conductive composition according to claim 8, by adding the water-dispersible resin fine particles (C) and water-soluble polyvalent metal compound (E) to a slurry in which the conductive carbon material (A), the water-soluble resin (B), and the aqueous liquid medium (D) are dispersed.

* * * * *